US010582359B2

(12) United States Patent
Arneson et al.

(10) Patent No.: US 10,582,359 B2
(45) Date of Patent: Mar. 3, 2020

(54) SYSTEM, APPARATUS, AND METHOD FOR FORMING A SECURED NETWORK USING TAG DEVICES HAVING A RANDOM IDENTIFICATION NUMBER ASSOCIATED THEREWITH

(71) Applicant: Matrics2, Inc., Warba, MN (US)

(72) Inventors: Michael R. Arneson, Warba, MN (US); William R. Bandy, Gambrills, MD (US)

(73) Assignee: Matrics2, Inc., Warba, MN (US)

( * ) Notice: Subject to any disclaimer, the term of this patent is extended or adjusted under 35 U.S.C. 154(b) by 165 days.

(21) Appl. No.: 15/451,063

(22) Filed: Mar. 6, 2017

(65) Prior Publication Data

US 2017/0257733 A1    Sep. 7, 2017

Related U.S. Application Data

(60) Provisional application No. 62/304,813, filed on Mar. 7, 2016.

(51) Int. Cl.
*H04W 4/80*    (2018.01)
*H04W 12/00*    (2009.01)
(Continued)

(52) U.S. Cl.
CPC ............ *H04W 4/80* (2018.02); *H04L 12/4604* (2013.01); *H04L 63/20* (2013.01); *H04L 67/10* (2013.01);
(Continued)

(58) Field of Classification Search
CPC ..... G06F 21/35; H04L 63/08; H04L 63/0876; H04W 12/06; H04W 12/04; H04W 4/00;
(Continued)

(56) References Cited

U.S. PATENT DOCUMENTS 8,344,853 B1 * 1/2013 Warner ............ G06K 19/07309
340/10.1
8,954,035 B2 * 2/2015 Ergen .................... H04W 12/04
455/411

(Continued)

FOREIGN PATENT DOCUMENTS

WO    2008/050312 A2    5/2008

OTHER PUBLICATIONS

International Search Report and Written Opinion received for PCT Patent Application Serial No. PCT/US2017/021146, dated May 25, 2017, 17 pages.

*Primary Examiner* — Aftab N. Khan
(74) *Attorney, Agent, or Firm* — Fiala & Weaver P.L.L.C.

(57) ABSTRACT

Embodiments described herein are directed to the manufacturing of tag devices, authenticating such devices, authorizing a tag reader apparatus to read tag devices external to the tag reader apparatus, and enabling an authorized tag reader apparatus to form a secured network comprising a plurality of devices, each of which comprise a tag device. The secured network may be formed by simply reading tag devices associated with consumer devices that a user desires to be in the secured network using the authorized tag reader apparatus. The random identification numbers associated with the plurality of consumer devices' tag devices may be used to retrieve instructions that are implemented by the consumer device(s) to form/configure the secured network. The authorized tag reader apparatus is the only device that is enabled to subsequently configure/reconfigure the network and/or the devices included therein, thereby securing the network for use only by the authorized tag reader apparatus.

20 Claims, 17 Drawing Sheets

(51) Int. Cl.
*H04L 29/06* (2006.01)
*H04L 12/46* (2006.01)
*H04L 29/08* (2006.01)
*H04W 12/08* (2009.01)

(52) U.S. Cl.
CPC ............ *H04W 12/00* (2013.01); *H04W 12/08* (2013.01); *H04L 67/12* (2013.01)

(58) Field of Classification Search
CPC ............ H04W 4/008; H04K 1/00; G06K 7/00; G06K 19/077
See application file for complete search history.

(56) References Cited

U.S. PATENT DOCUMENTS

| | | | | |
|---|---|---|---|---|
| 9,024,729 | B1 * | 5/2015 | Diorio | G08B 13/2454 340/10.1 |
| 9,369,342 | B2 * | 6/2016 | Dyba | H04L 67/34 |
| 10,098,000 | B2 * | 10/2018 | Fan | H04W 12/08 |
| 2002/0126013 | A1 | 9/2002 | Bridgelall | |
| 2003/0153300 | A1 * | 8/2003 | Nakao | H04W 12/06 455/410 |
| 2004/0212500 | A1 * | 10/2004 | Stilp | G08B 19/005 340/541 |
| 2005/0088299 | A1 | 4/2005 | Bandy et al. | |
| 2006/0170534 | A1 | 8/2006 | Arneson et al. | |
| 2006/0180595 | A1 | 8/2006 | Arneson et al. | |
| 2007/0096882 | A1 | 5/2007 | Bandy et al. | |
| 2007/0106897 | A1 * | 5/2007 | Kulakowski | G06F 21/35 713/171 |
| 2007/0126585 | A1 | 6/2007 | Okunev et al. | |
| 2007/0139163 | A1 | 6/2007 | Powell et al. | |
| 2007/0202807 | A1 * | 8/2007 | Kim | H04B 5/0062 455/41.2 |
| 2008/0001724 | A1 * | 1/2008 | Soleimani | H04L 63/083 340/10.51 |
| 2008/0029732 | A1 | 2/2008 | Roberts et al. | |
| 2008/0136639 | A1 * | 6/2008 | Deoalikar | G06K 7/0008 340/572.1 |
| 2008/0278325 | A1 * | 11/2008 | Zimman | G06F 21/32 340/572.1 |
| 2008/0297326 | A1 * | 12/2008 | Chakraborty | H04L 63/12 340/10.52 |
| 2011/0154447 | A1 * | 6/2011 | Dennis | G06F 21/35 726/4 |
| 2013/0145420 | A1 | 6/2013 | Ting et al. | |
| 2013/0181819 | A1 | 7/2013 | Mclaren | |
| 2015/0242842 | A1 | 8/2015 | Piva et al. | |
| 2015/0294214 | A1 | 10/2015 | Boulby | |
| 2016/0188920 | A1 * | 6/2016 | Kelly | G06K 7/10158 340/10.34 |
| 2016/0210547 | A1 * | 7/2016 | Dekeyser | G06K 7/065 |
| 2018/0096175 | A1 * | 4/2018 | Schmeling | B29C 64/10 |

\* cited by examiner

*Security Process*

SYSTEM, APPARATUS, AND METHOD FOR FORMING A SECURED NETWORK USING TAG DEVICES HAVING A RANDOM IDENTIFICATION NUMBER ASSOCIATED THEREWITH

CROSS-REFERENCE TO RELATED APPLICATIONS

This application claims the benefit of U.S. Provisional Patent Application No. 62/304,813, filed on Mar. 7, 2016, which is incorporated by reference herein in its entirety.

TECHNICAL FIELD

Embodiments described herein relate to secured networks and tag-based security.

BACKGROUND ART

The Internet of Things (IoT) refers to a platform (e.g., network structure) such as an Internet-like network, which may link identifiable things (e.g., objects or people) and/or their virtual representations. The IoT allows objects to be sensed and/or controlled remotely across existing network infrastructure, creating opportunities for more direct integration of the physical world into computer-based systems, thus resulting in improved efficiency, accuracy, and economic benefit, as well as reduced human intervention. The success of the idea of connecting devices to make them more efficient is dependent upon access to and storage and processing of data. For this purpose, companies working on the IoT collect data from multiple sources and store it in their cloud-based network for further processing. This leaves the door wide open for privacy and security dangers and single point vulnerability of multiple systems.

BRIEF SUMMARY

Methods, systems, and apparatuses are described for reconfigurable secure wireless network(s) using tags with random number IDs, substantially as shown in and/or described herein in connection with at least one of the figures, as set forth more completely in the claims.

BRIEF DESCRIPTION OF THE DRAWINGS/FIGURES

The accompanying drawings, which are incorporated herein and form a part of the specification, illustrate embodiments and, together with the description, further serve to explain the principles of the embodiments and to enable a person skilled in the pertinent art to make and use the embodiments.

Embodiments will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

I. Introduction

Figure 1:
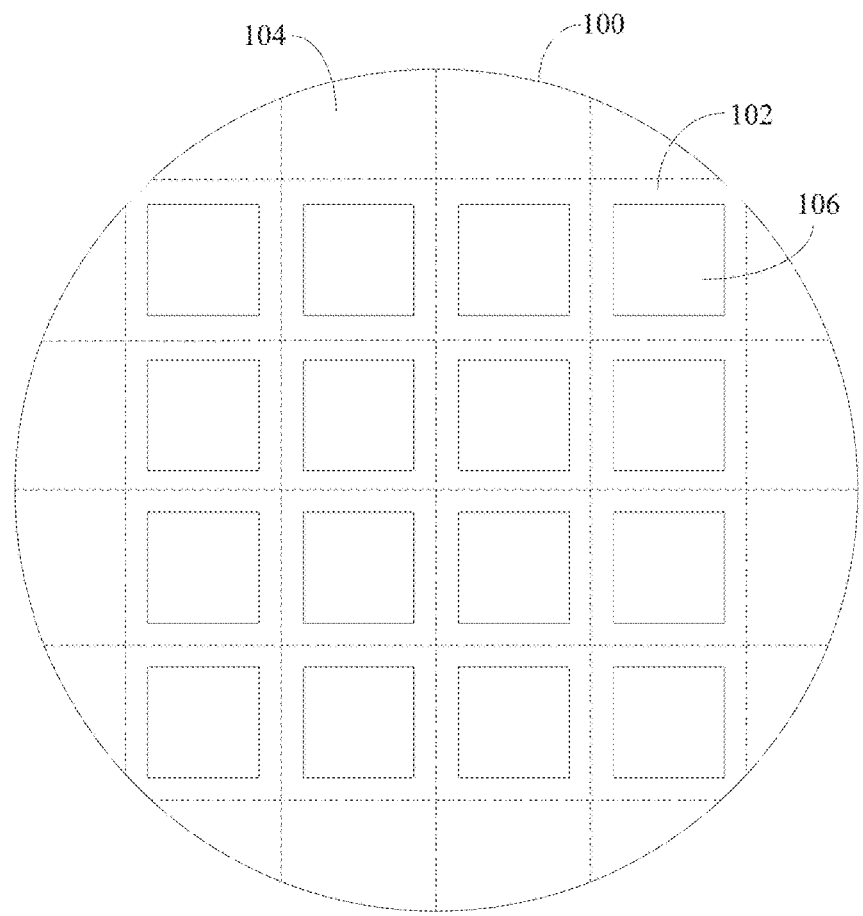
FIG. 1 shows a plan view of a wafer plate, according to an example embodiment.

The present specification discloses numerous example embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the discussion, unless otherwise stated, adjectives such as "substantially," "approximately," and "about" modifying a condition or relationship characteristic of a feature or features of an embodiment of the disclosure, are understood to mean that the condition or characteristic is defined to be within tolerances that are acceptable for operation of the embodiment for an application for which it is intended.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein can be spatially arranged in any orientation or manner.

Still further, it should be noted that the drawings/figures are not drawn to scale unless otherwise noted herein.

As used herein an identifier may be referred to as an "ID" unless explicitly stated otherwise.

Numerous exemplary embodiments are now described. Any section/subsection headings provided herein are not intended to be limiting. Embodiments are described throughout this document, and any type of embodiment may be included under any section/subsection. Furthermore, it is contemplated that the disclosed embodiments may be combined with each other in any manner. That is, the embodiments described herein are not mutually exclusive of each other and may be practiced and/or implemented alone, or in any combination.

Embodiments described herein are directed to the manufacturing of tag devices, authenticating such devices, authorizing a tag reader apparatus to read tag devices external to the tag reader apparatus, and enabling an authorized tag reader apparatus to form a secured network comprising a plurality of consumer devices, each of which comprise a tag device. The secured network may be formed by simply reading tag devices associated with the consumer devices that a user desires to be in the secured network using the authorized tag reader apparatus. The random identification numbers associated with the tag devices of the plurality of consumer devices may be used to retrieve instructions that are implemented by the consumer device(s) to form/configure the secured network. The authorized tag reader apparatus is the only device that is enabled to subsequently configure/reconfigure the network and/or the consumer devices included therein, thereby securing the network for use only by the authorized tag reader apparatus.

In particular, a system is described herein. The system includes at least one processor circuit and a memory coupled to the at least one processor circuit, the memory storing instructions, which, when executed by the at least one processor circuit, are configured to perform operations in an authorized tag reader apparatus. In accordance with the operations, a tag device attached to each of a plurality of consumer devices is read. A random identification number associated with each of the plurality of consumer devices is received via said reading. Each random identification number associated with each of the plurality of consumer devices is provided to a database. Instructions for wirelessly connecting at least a first consumer device of the plurality of consumer devices with a second consumer device of the plurality of consumer devices is received from the database. The instructions are provided to at least the first consumer device of the plurality of consumer devices. The first consumer device is configured to form the secured network between at least the first consumer device and the second consumer device using the instructions.

A computer-readable storage medium having program instructions recorded thereon that, when executed by a processing device, perform a method for forming a secured network comprising a plurality of consumer devices is also described herein. In accordance with the method, a tag device attached to each of the plurality of consumer devices is read. A random identification number associated with each of the plurality of consumer devices is received via said reading. Each random identification number associated with each of the plurality of consumer devices is provided to a database. Instructions for wirelessly connecting at least a first consumer device of the plurality of consumer devices with a second consumer device of the plurality of consumer devices is received from the database. The instructions are provided to at least the first consumer device of the plurality of consumer devices. The first consumer device is configured to form the secured network between at least the first consumer device and the second consumer device using the instructions.

A method implemented by an authorized tag reader apparatus for forming a secured network comprising a plurality of consumer devices is further described herein. In accordance with the method, a tag device attached to each of the plurality of consumer devices is read. A random identification number associated with each of the plurality of consumer devices is received via said reading. Each random identification number associated with each of the plurality of consumer devices is provided to a database. Instructions for wirelessly connecting at least a first consumer device of the plurality of consumer devices with a second consumer device of the plurality of consumer devices is received from the database. The instructions are provided to at least the first consumer device of the plurality of consumer devices. The first consumer device is configured to form the secured network between at least the first consumer device and the second consumer device using the instructions.

These and further embodiments and variations are further described in the next section.

II. Example Embodiments

A. Tag Device and Manufacture Thereof

Figure 2:
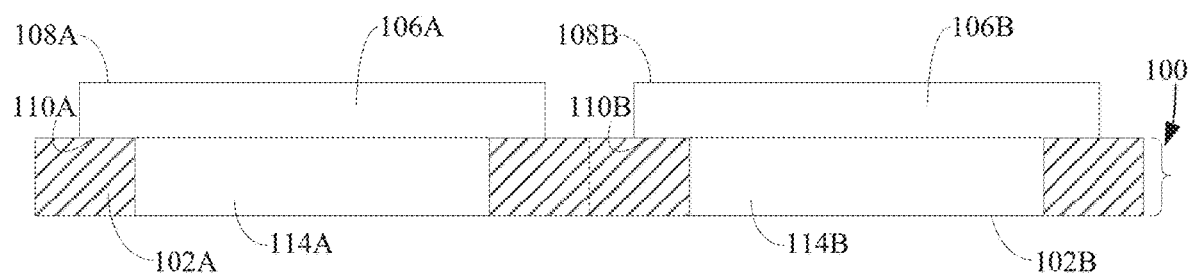
FIG. 2 shows a side cross-sectional view of a portion of the wafer plate shown in FIG. 1, with first and second singulated semiconductor dies shown mounted to first and second substrate regions of the wafer plate over push pin holes, respectively.

FIG. 1 shows a plan view of a wafer plate 100, according to an example embodiment. Wafer plate 100 may be a silicon wafer, a gallium arsenide wafer, an aluminum plate, a plastic plate, or other wafer plate type. As shown in FIG. 1, wafer plate 100 has a surface 104 defined by a plurality of semiconductor substrate location regions 102 (shown as dotted rectangles in FIG. 1). As further shown in FIG. 1, a die 106 is mounted on each substrate region 102. Dies 106 may be formed by aligning a semiconductor wafer over wafer plate 100, aligning push pin holes in wafer plate 100 so that they are centered upon dies 106, bringing the semiconductor wafer into contact with wafer plate 100, then singulating dies 106 into individual dies (as shown in FIG. 1). FIG. 2 shows a side cross-sectional view of a portion of wafer plate 100, with first and second dies 106A and 106B shown mounted to first and second substrate regions 102A and 102B, respectively, and aligned with push pin holes 114A and 114B, respectively. Dies 106 may be placed and/or positioned on substrates regions 102 in any manner, including through the use of a pick-and-place apparatus, a self-aligning process, or other technique. As shown in FIG. 1, dies 106 each comprise a first surface (e.g., first surface 108A) and a second surface (e.g., second surface 110A) that opposes the first surface. Dies 106 are mounted to substrate regions vis second surface 110. An adhesive material (not shown) may be applied to surfaces of substrate regions 102 and/or the second surfaces of dies 106 prior to placing dies 106 on substrate regions 102, and/or may be inserted between dies 106 and substrate regions 102 after attachment thereto (e.g., an underfill material). The adhesive material may be used to aid in adhering dies 106 to substrate regions 102. Any suitable adhesive material may be used, including a conventional die-attach material, an epoxy, an adhesive film, etc.

Each of dies 106 may comprise a memory including one or more memory locations. In accordance with an embodiment, the one or more memory locations are read-only memory (ROM) locations implemented in any suitable semiconductor technology, such as CMOS (complementary metal-oxide-semiconductor), laser programmable links, etc. Each of dies 106 (e.g., a memory location included therein) may be programmed to store an individually unique, random identification number. In an embodiment, the individually unique, random identification number may be at least a 64-bit number, although in other embodiments, the random identification number may have other bit lengths. Each of dies 106 may be programmed with the individually unique, random identification number before being attached to wafer plate 100, while still attached to wafer plate 100 (i.e., before dies 106 are pushed of wafer plate 100), or after. Examples of memory types on dies 106 include a programmable ROM (e.g., a laser programmable ROM), a field programmable ROM (FPROM), a one-time programmable non-volatile memory (OTP NVM), and/or the like.

Each semiconductor substrate region 102 is configured to be packaged separately into a separate tag device. Any number of substrate regions 102 may be included in wafer plate 100, including 10s, 100s, 1000s, and even larger numbers.

Figure 3:
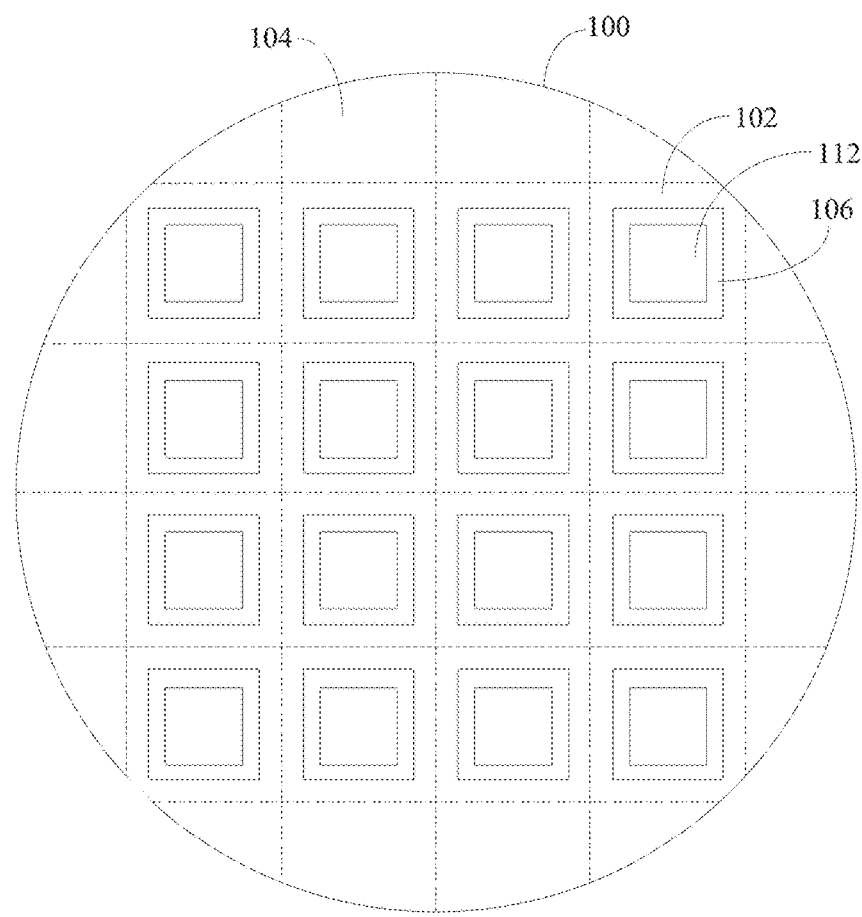
FIG. 3 shows a plan view of singulated semiconductor dies attached to a wafer plate having an adhesive layer applied thereon, according to an example embodiment.
Figure 4:
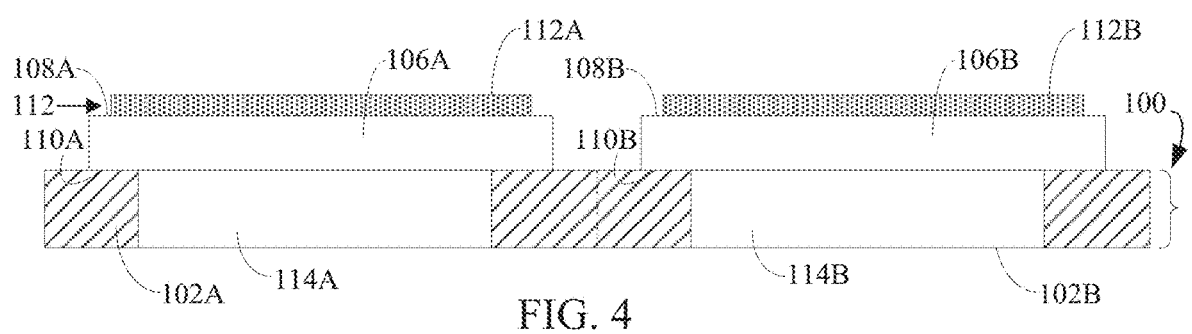
FIG. 4 shows a side cross-sectional view of a portion of the wafer plate shown in FIG. 3, with first and second dies having an adhesive layer applied thereon.

In an embodiment, after each of dies 106 has been programmed with an individually unique, random identification number, an adhesive layer may be applied to first surface 108. FIG. 3 shows a plan view of dies 106 attached to wafer plate 100 having an adhesive layer 112 applied thereon, according to an example embodiment. FIG. 4 shows a side cross-sectional view of a portion of wafer plate 100 shown in FIG. 3, with first and second dies 106A and 106B each having an adhesive layer (i.e., adhesive layers 112A and 112B) applied thereon. As shown in FIGS. 3 and 4, an adhesive layer is applied onto each first surface (e.g., first surface 108A and first surface 108B) of dies 106. Any suitable adhesive material may be used for adhesive layer 112, including a conventional die-attach material, an epoxy, an adhesive film, etc. In accordance with an embodiment, the adhesive material is an anisotropic conducting adhesive. It is noted that while FIGS. 3 and 4 show the adhesive layer as partially covering the first surfaces of dies 106, the adhesive layer 112 may cover each second surface in its entirety.

Figure 5:
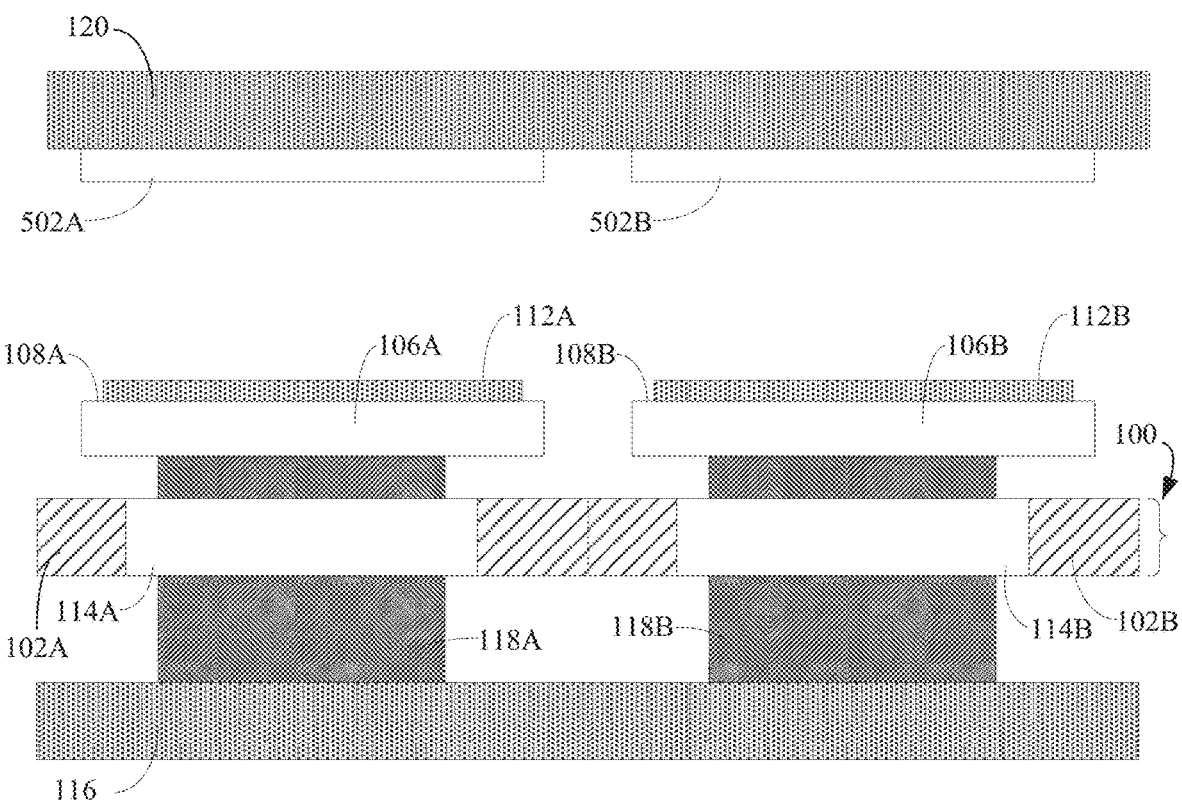
FIG. 5 shows a side cross-sectional view of a portion of a wafer plate with dies pushed off and separated from the wafer plate, according to an example embodiment.

As shown in FIG. 5, after adhesive layer 112 is applied, a push pin plate 116 may be brought into proximity of wafer plate 100 such that push pins 118A and 118B may be entered into push pin holes 114A and 114B to push dies 106A and 106B off wafer plate 100 and onto a substrate 120 comprising antennas 502A and 502B. Contact pads (not shown) of dies 106A and 106B are aligned with contact pads (not shown) of antennas 502A and 502B, and dies 106A and 106B are pushed securely onto substrate 120, where electrical contact between the contact pads is accomplished with adhesive 112A and 112B.

Figure 6:
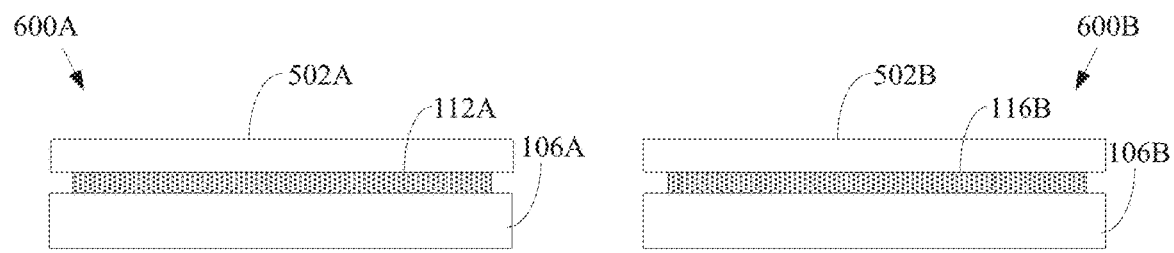
FIG. 6 shows a first tag device and a second tag device, according to an example embodiment.

As shown FIG. 6, the resulting tag devices (i.e., a first tag device 600A and a second tag device 600B) are singulated into a plurality of separate radio frequency (RF) tag devices. Any number of tag devices 600 may be obtained from wafer plate 100, including 10s, 100s, or even millions of tag devices 600.

Dies 106 may be singulated from on wafer plate 100 in any appropriate manner to physically separate them from each other, as would be known to persons skilled in the relevant art(s). For instance, dies 106 may be singulated by a saw, router, laser, etc., in a conventional or other fashion.

An antenna device may be attached to die 106 to form a tag device in multiple ways. For instance, as shown in FIG. 6, antenna device 502A is attached to die 106A via adhesive layer 112A, and antenna device 502B is attached to die 106B via adhesive layer 112B. It is noted that antenna devices 502 may be coupled to dies 106 via one or more electrical connections, which are not shown for the sake of brevity.

In accordance with an embodiment, antennas 502 are near-field communication antennas, thereby making tag devices 600 NFC-based.

Figure 7:
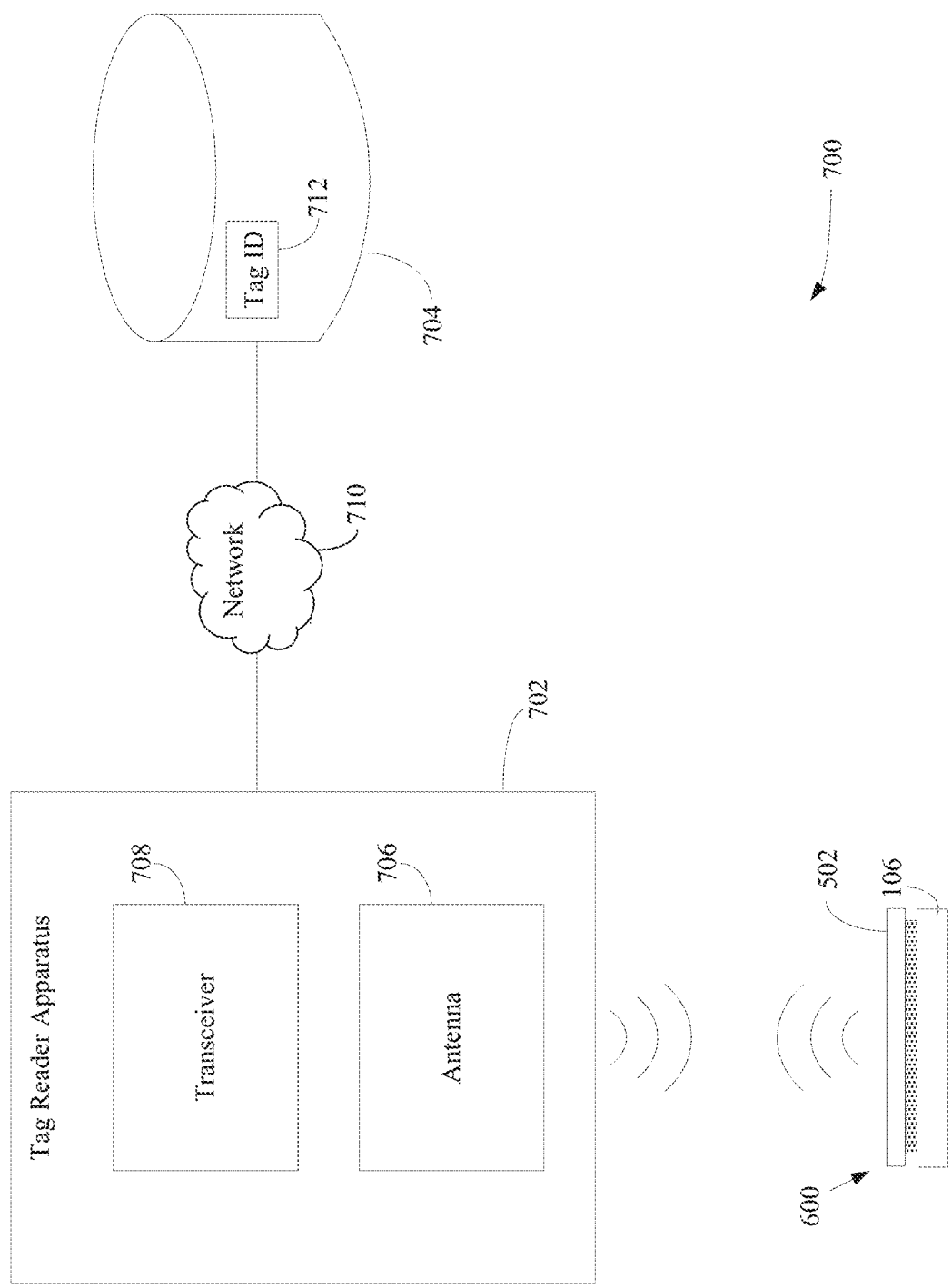
FIG. 7 shows a block diagram of a system for authenticating and maintaining a tag device, according to an example embodiment.

Tag devices 600 may be authenticated and maintained by a database. For example, FIG. 7 shows a block diagram of a system 700 for authenticating and maintaining a tag device according to an example embodiment. As shown in FIG. 7, system 700 includes a tag reader apparatus 702 and one or more tag manufacturer databases 704 configured to authenticate and maintain a tag device 600. Tag reader apparatus 702 and tag manufacturer database server(s) 704 are communicatively connected via a network 710. Tag device 600 is an example of tag device 600A or tag device 600B, as described above with reference to FIG. 6. Tag manufacturer database server(s) 704 may be maintained by the manufacturer of the tag devices described herein (e.g., tag device 600). Tag manufacturer database server(s) 704 may include one or more host servers, cloud-implemented components, and/or other host components/infrastructure in embodiments.

Tag reader apparatus 702 is configured to read tag device 600 to obtain the random identification number stored in die 106 (also referred herein as the Tag ID). For example, tag reader apparatus 702 may comprise an antenna 706, which is configured to communicate with an antenna 502 of tag device 600. In accordance with an embodiment, antenna 704 and antenna 502 are NFC antennas. In accordance with such an embodiment, tag device 600 is configured to transmit the random identification number stored in die 106 when antenna 706 comes within a near field communication distance (e.g., less than or equal to 10 cm) of antenna 502. When antenna 706 comes within the near field communication distance, it generates a magnetic field. Antenna 502 receives and uses the magnetic field to generate electrical impulses to communicate the random identification number stored by die 106 to tag reader apparatus 702 using any suitable near field communication techniques, as would be known to persons skilled in the relevant art(s).

For instance, antennas 706 and 502 may perform a near-field communication using magnetic induction between them (as loop antennas located within each other's near field), effectively forming an air-core transformer. The communication may operate within the globally available and unlicensed radio frequency ISM band of 13.56 MHz, or other frequencies. When tag device 600 is a passive tag, antenna 706 may provide a carrier field, and tag device 600 may answer by modulating the carrier field. In this mode, tag device 600 may draw its operating power from the provided electromagnetic field, thus making tag device 600 a transponder. When tag device 600 is an active tag, antenna 706 and tag device 600 may communicate by alternately generating their own fields. A device deactivates its RF field while it is waiting for data. In this mode, both tag reader apparatus 702 and tag device 600 may have their own power supplies (e.g., batteries, etc.).

After receiving the random identification number, tag reader apparatus 702 may be configured to provide the random identification number to tag manufacturer database server(s) 704 for storage thereby. For example, as further shown in FIG. 7, tag reader apparatus 702 further comprises a transceiver 708. Transceiver 708 may be configured to provide the random identification number to tag manufacturer database server(s) 704 via network 710. Network 710 may comprise one or more networks such as local area networks (LANs) (either wired or wireless (e.g., Wi-Fi)), wide area networks (WANs), enterprise networks, the Internet, etc., and may include one or more of wired and/or wireless portions. Tag manufacturer database server(s) 704 may be configured to store the random identification number (i.e., Tag ID 712) upon receiving the random identification number.

Tag reader apparatus 702 may be configured to read each of the random identification numbers associated with each tag device manufactured from wafer plate 100 (and other wafer plates) and provide the random identification numbers to tag manufacturer database server(s) 704. Thus, tag manufacturer database server(s) 704 maintain the random identification numbers for each tag device 600 manufactured by the manufacturer of such devices.

When a random identification number of a tag device 600 is stored by tag manufacturer database server(s) 704, tag device 600 is considered to be authenticated in that the manufacturer is aware that such tag device was successfully manufactured and is ready to be shipped to a retailer, which in turn places the tag device on a product sold thereby. Tag manufacturer database server(s) 704 may further associate the random identification numbers with a retailer identifier that identifies the retailer to which the tag device(s) were shipped. Whenever a customer shopping at the retailer reads tag device 600 using his tag reader apparatus, the tag reader apparatus provides the random identification number associated with the tag device 600 to tag manufacturer database server(s) 704 for authentication thereby. For example, the manufacturer may determine whether a random identification number is valid by comparing it to the random identification numbers stored in tag manufacturer database server(s) 704. Upon finding a match, tag manufacturer database server(s) 704 may determine the retailer to which the tag device was shipped using the retailer identifier associated with the random identification number and provide the determined retailer with the random identification number. The retailer is enabled to cross reference the received random identification number with its own database that maintains an association with the random identification number and the product. Once the retailer determines which product was associated with the tag device read by the customer's tag reader apparatus, the retailer may perform an appropriate action (e.g., provide advertisement information associated with the product to the user, provide coupon/discount information associated with the product, provide descriptions associated with the product to the user, provide specifications associated with the product to the user, provide use instructions associated with the product to the user, provide warranty information associated with the product to the user, etc.).

Figure 8:
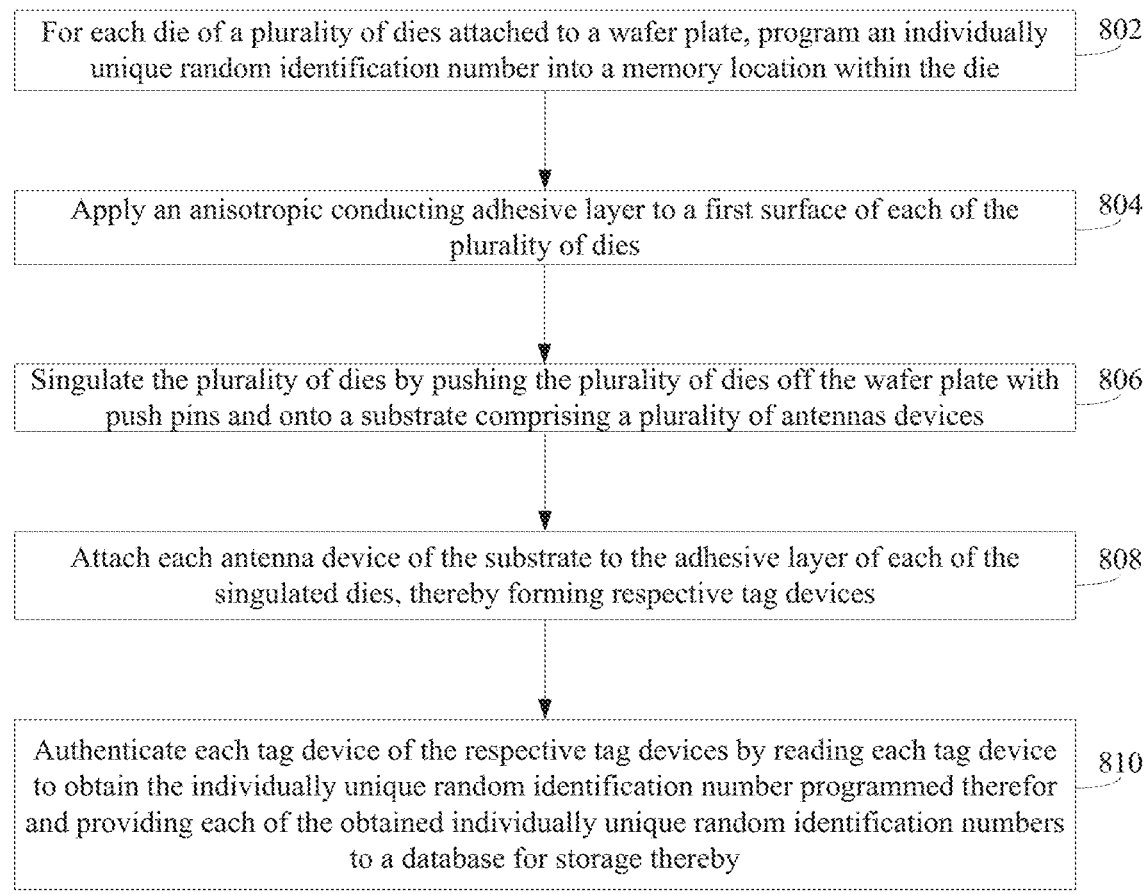
FIG. 8 shows a flowchart providing example steps for manufacturing a tag device, according to an example embodiment.

Accordingly, in embodiments tag devices may be manufactured in many ways. For example, FIG. 8 shows a flowchart 800 providing example steps for manufacturing a tag device, according to an example embodiment. For instance, tag devices 600A, 600B, and 600 shown in FIGS. 6 and 7 may be manufactured according to flowchart 800. Flowchart 800 is described as follows.

As shown in FIG. 8, flowchart 800 begins with step 802. At step 802, for each die of a plurality of dies attached to a wafer plate, an individually unique, random identification number is programmed into a memory location with the die. For example, with reference to FIGS. 1 and 2, an individually, unique random identification number is programmed into dies 106 attached to wafer plate 100.

In accordance with one or more embodiments, the individually unique, random identification number is at least an individually, unique 64-bit random identification number.

In accordance with one or more embodiments, for each die of the plurality of dies 106 attached to wafer plate 100, the individually unique, random identification number is laser programmed into the memory location within the die.

In accordance with one or more embodiments, the memory location for each die of the plurality of dies is a read-only memory location.

At step 804, an anisotropic conducting adhesive layer is applied to a first surface of each of the plurality of dies. For example, with reference to FIGS. 3 and 4, adhesive layer 112 is applied to first surfaces 108A and 108B of dies 106A and 106B.

At step 806, the plurality of dies is singulated by pushing the plurality of dies off the wafer plate with push pins and onto a substrate comprising a plurality of antenna devices. For example, with reference to FIG. 5, dies 106 are singulated by pushing dies 106 off wafer plate 100 with push pins 118A and 118B and onto substrate 120 comprising a plurality of antennas 502.

At step 808, each antenna device of the substrate is attached to the adhesive layer of each of the singulated dies, thereby forming respective tag devices. For example, with reference to FIG. 6, antenna device 502A is attached to adhesive layer 112A, and antenna device 502B is attached to adhesive layer 112B, thereby forming tag devices 600A and 600B.

In accordance with an embodiment, antenna devices 502A and 502B are NFC antennas.

At step 810, each tag device of the respective tag devices is authenticated by reading each tag device to obtain the individually unique, random identification number programmed therefor, and each of the obtained individually unique, random identification numbers are provided to a database for storage thereby. For example, with reference to FIG. 7, tag reader apparatus 702 reads tag device 600 to obtain the individually, unique random identification number programmed therefor. Transmitter 708 of tag reader apparatus 702 provides the individually, unique random identification number to tag manufacturer database server(s) 704 for storage thereby (e.g., shown as Tag ID 712)

B. Authorized Tag Reader Apparatus

Figure 9:
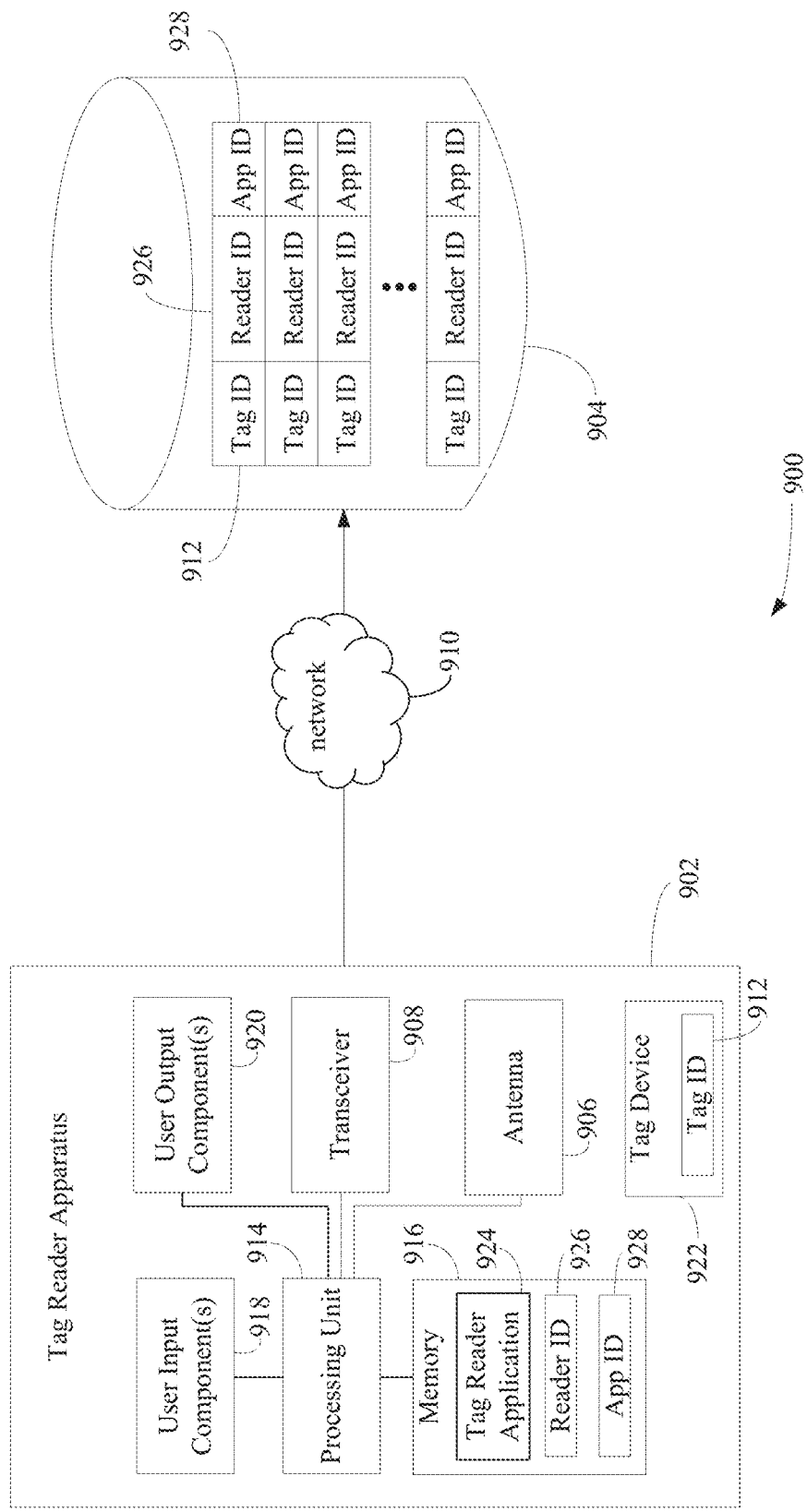
FIG. 9 shows a block diagram of a system for authorizing a tag reader apparatus to read tag devices, according to an example embodiment.

In accordance with an embodiment, a tag reader apparatus may be authorized to read tags manufactured from a particular manufacturer. For instance, FIG. 9 shows a block diagram of a system 900 for authorizing a tag reader apparatus 902 to read tag devices, according to an example embodiment. As shown in FIG. 9, system 900 includes tag reader apparatus 902 and tag manufacturer database server(s) 904. Tag reader apparatus 902 and tag manufacturer database server(s) 904 are communicatively connected via a network 910. Tag reader apparatus 902, tag manufacturer database server(s) 904, and network 910 are examples of tag reader apparatus 702, tag manufacturer database server(s) 704, and network 710, as described above with reference to FIG. 7.

Tag reader apparatus 902 may comprise any of a wide variety of portable electronic devices mentioned herein or otherwise known, including but not limited to a smart phone, a tablet computer, a laptop computer, a personal data assistant, a handheld tag reader, or the like, in addition to, special purpose NFC readers designed for specific applications, such as for cash registers, money counting machines, etc.

As shown in FIG. 9, tag reader apparatus 902 includes a processing unit 914. Processing unit 914 includes hardware that comprises a central processing unit (CPU), a microprocessor, a multi-core processor, or other integrated circuit that is configured to execute computer program instructions that are retrieved from memory (e.g., memory 916), thereby causing certain operations to be performed. As further shown in FIG. 9, processing unit 914 is connected to one or more user input components 918, one or more user output component 920, memory 916, an antenna 906, and a transceiver 908. Antenna 906 and transceiver 908 are examples of antenna 706 and transceiver 708, as described above with reference to FIG. 7. Tag reader apparatus 902 also includes a tag device 922. Tag device 922 is an example of tag device 600, as described above with reference to FIGS. 6 and 7.

During manufacture of tag reader apparatus 902, an identifier may be assigned to tag reader apparatus 902. In accordance with an embodiment, the identifier is a media access control (MAC) address, which is a unique identifier assigned to a network interface controller (NIC) (e.g., transceiver 908) included in tag reader apparatus 902. The identifier may be stored in memory 916 as Reader ID 926.

Tag device 922 may also be attached to or included in tag reader apparatus 902 during the manufacture of tag reader apparatus 902. In particular, tag device 922 is attached in proximity to antenna 906. After manufacture of tag reader apparatus 902 is complete, tag reader apparatus 902 may undergo a testing process, where functionality of tag reader apparatus 902 is tested and verified. One step of the testing process may comprise activating the NFC functionality of tag reader apparatus 902, which causes processing unit 914 to activate antenna 906 in order to read tag device 922. Tag device 922 returns the random identification number stored therein (i.e., Tag ID 912). Processing unit 914 then causes transceiver 908 to provide Reader ID 926 and Tag ID 912 to tag manufacturer database server(s) 904 via network 910. Tag manufacturer database server(s) 904 store and associate Reader ID 926 with Tag ID 912, thereby linking tag device 922 with tag reader apparatus 902 in tag manufacturer database server(s) 904.

User input component(s) 918 may comprise one or more of a touch screen, keypad, button, microphone, camera, or other component suitable for enabling a user to provide input to tag reader apparatus 902. User output component(s) 920 may comprise one or more of a display, audio speaker, haptic feedback element, or other component suitable for providing output to a user of tag reader apparatus 902.

Memory 916 comprises one or more volatile or non-volatile memory devices that are operable to store computer program instructions (also referred to herein as computer program logic). These computer program instructions may be retrieved from memory 916 and executed by processing unit 914 in a well-known manner to cause processing unit 914 to perform certain operations.

As further shown in FIG. 9, memory 916 stores a tag reader application 924. Tag reader application 924 comprises computer program instructions (e.g., firmware and/or software) that, when executed by processing unit 914, causes processing unit 914 to activate antenna 906 in order to read tag devices that are external to tag reader apparatus 702 (i.e., tag device 922 is not read). Examples of tag devices that are external to tag reader apparatus 902 include, but are not limited to, tag devices included on products or items sold at stores, fliers, advertisements, etc.

Tag reader application 924 is also associated with an application identifier that uniquely identifies tag reader application 924. The identifier may be a randomly-assigned number. The identifier may be stored in memory 916 as App ID 928. Upon installation and/or initial activation of tag reader application 924, processing unit 914 may cause transceiver 908 to provide App ID 928 to tag manufacturer database server(s) 904 via network 910. Tag manufacturer database server(s) 904 store App ID 928 and associate App ID 928 with Reader ID 926 and Tag ID 912, thereby linking tag device 922, tag reader apparatus 902, and tag reader application 924 in tag manufacturer database server(s) 904. Once tag device 922, tag reader apparatus 902, and tag reader application 924 are linked in tag manufacturer database server(s) 904, tag reader apparatus 902 is considered to be an authorized tag reader apparatus.

As shown in FIG. 9, tag manufacturer database server(s) 904 are configured to store reader identifiers (e.g., Reader ID 926), tag identifiers (e.g., Tag ID 912) and application identifiers (e.g., App ID 928) for a plurality of tag reader apparatuses. Each time a tag reader application (e.g., tag reader application 924) installed on a tag reader apparatus (e.g., tag reader apparatus 902) is used to read an external tag device, the associated reader identifier, tag identifier, and application identifier may be provided to tag manufacturer database server(s) 904 to determine whether the tag reader apparatus is authorized to read external tag devices. Tag manufacturer database server(s) 904 may determine whether the reader identifier, tag identifier, and application identifier are stored and associated therein. If tag manufacturer database server(s) 904 determine that the reader identifier, tag identifier, and application identifier are stored and associated therein, tag manufacturer database server(s) 904 may send a notification to the tag reader apparatus indicating that the tag reader apparatus is authorized, thereby enabling the tag reader apparatus to read the external tag device (e.g., read further data stored on the tag device). In contrast, if tag manufacturer database server(s) 904 determine that the reader identifier, tag identifier, and application identifier are not stored and/or associated therein, tag manufacturer database server(s) 904 may send a notification to the tag reader apparatus indicating that the tag reader apparatus is not authorized, thereby disabling the tag reader apparatus from reading the external tag device.

Figure 10:
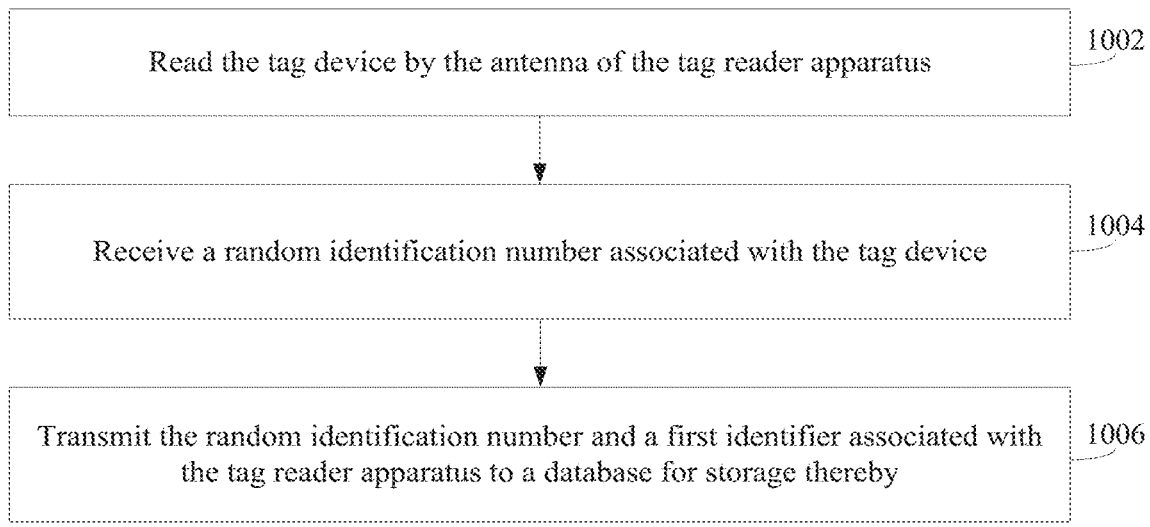
FIG. 10 depicts a flowchart of a method for authorizing a tag reader apparatus comprising an antenna and a tag device attached in proximity to the antenna, according to an example embodiment.

Accordingly, in embodiments, a tag reader apparatus may be authorized in many ways. For instance, FIG. 10 depicts a flowchart 1000 of a method for authorizing a tag reader apparatus comprising an antenna and a tag device attached in proximity to the antenna, according to an example embodiment. The method of flowchart 1000 may be implemented by tag reader apparatus 902 shown in FIG. 9. Accordingly, flowchart 1000 is described as follows with reference to system 900 of FIG. 9. Other structural and operational embodiments will be apparent to persons skilled in the relevant art(s) based on the following discussion regarding flowchart 1000 and system 900.

As shown in FIG. 10, flowchart 1000 begins with step 1002. At step 1002, the tag device is read by the antenna of the tag reader apparatus. For example, with reference to FIG. 9, processing unit 914 activates antenna 906 in order to read tag device 922.

In accordance with one or more embodiments, the antenna is an NFC antenna.

In accordance with one or more embodiments, the tag reader apparatus comprises at least one of a smart phone, a tablet, a personal data assistant, or a special purpose NFC reader (e.g., cash registers, money counting machines, etc.).

At step 1004, a random identification number associated with the tag device is received. For example, with reference to FIG. 9, antenna 906 receives Tag ID 912 from tag device 922.

At step 1006, the random identification number and a first identifier associated with the tag reader apparatus is transmitted to a database for storage thereby. For example, with reference to FIG. 9, transceiver 908 transmits Tag ID 912 and Reader ID 926 to tag manufacturer database server(s) 904 for storage thereby.

In accordance with one or more embodiments, the database associates the random identification number with the first identifier. For example, with reference to FIG. 9, tag manufacturer database server(s) 904 associates Tag ID 912 with Reader ID 926.

In accordance with one or more embodiments, the first identifier is a MAC address associated with the tag reader apparatus.

Figure 11:
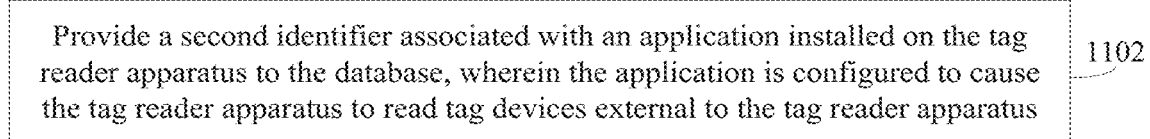
FIG. 11 shows a step for providing an additional identifier, according to an example embodiment.

In accordance with one or more embodiments, the tag reader apparatus provides additional identifiers to the database. For example, FIG. 11 shows a step 1102 for providing an additional identifier, according to an example embodiment. Step 1102 may be implemented by tag reader apparatus 902 shown in FIG. 9. Accordingly, step 1102 will be described with reference to system 900 of FIG. 9. Other structural and operational embodiments will be apparent to persons skilled in the relevant art(s) based on the following discussion regarding step 1102 and system 900.

At step 1102, a second identifier that is associated with an application installed on the tag reader apparatus is provided to the database for storage thereby, according to an example embodiment. For instance, with reference to FIG. 9, transceiver 908 provides App ID 928 (which uniquely identifies tag reader application 924) to tag manufacturer database server(s) 904 for storage thereby.

In accordance with one or more embodiments, the database is configured to associate the random identification number with the first identifier and the second identifiers. For example, with reference to FIG. 9, tag manufacturer database server(s) 904 associates Tag ID 912 with Reader ID 926 and App ID 928.

C. System and Method for Forming Secured Network Using an Authorized Tag Reader Apparatus The authorized tag reader apparatus described above with reference to FIGS. 9-11 may be used to form a secured network. The secured network may be formed by simply reading tag devices associated with devices (e.g., consumer devices) that a user desires to be in the secured network using the authorized tag reader apparatus. The tag devices then provide their associated random identification numbers to the authorized tag reader apparatus. The random identification numbers may be used to access certain information (e.g., authorization codes, configuration steps, etc.) associated with the consumer devices. The information is used to automatically connect the consumer devices to one another and/or configure such consumer devices for communications therebetween, thereby forming a network. The authorized tag reader apparatus used to form the network may be the only device that is subsequently enabled to configure or reconfigure the network and/or the consumer devices included therein, thereby securing the network for use only by the authorized tag reader apparatus.

Figure 12:
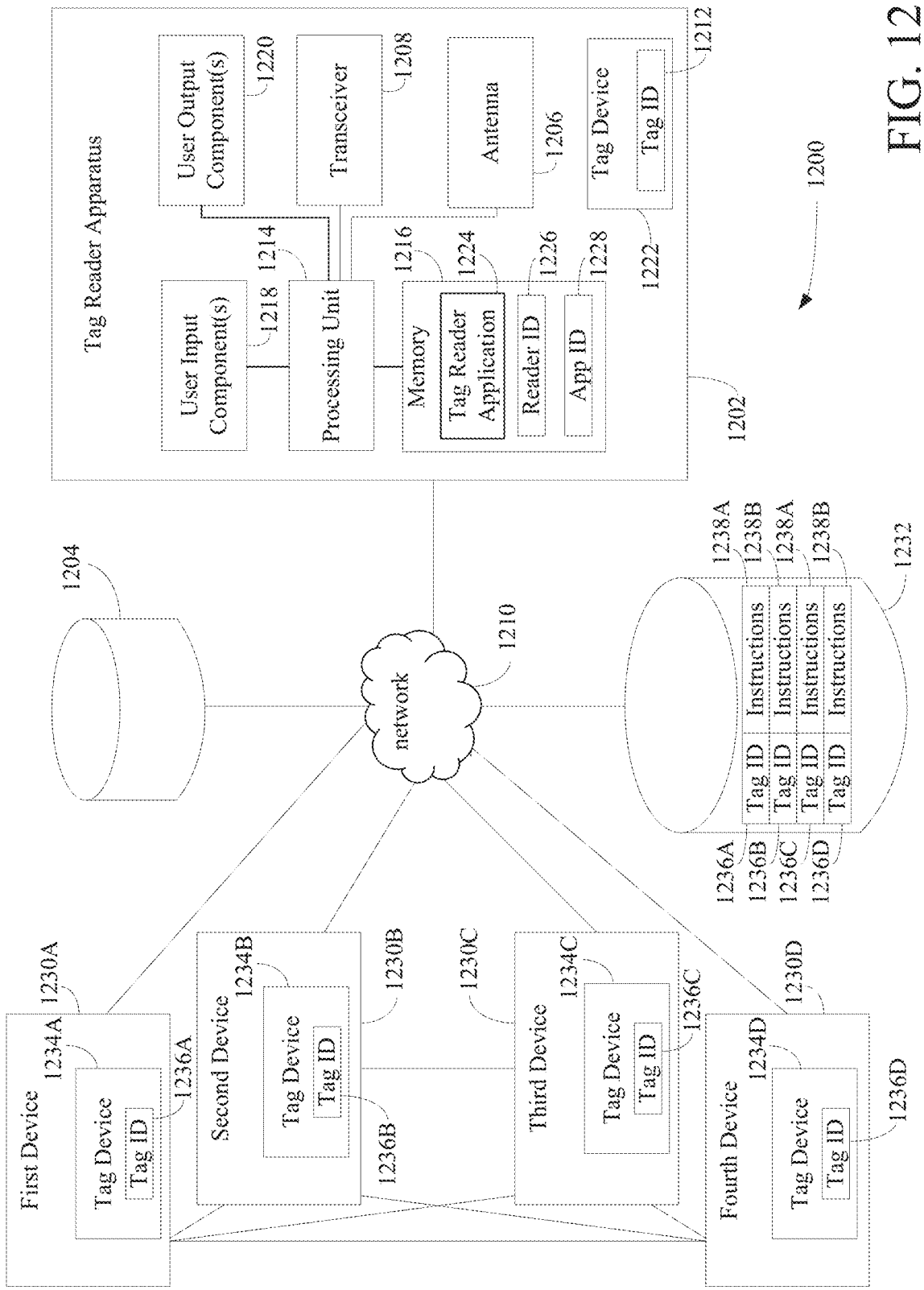
FIG. 12 shows a block diagram of a system for forming a secured network, according to an example embodiment.

FIG. 12 shows a block diagram of a system 1200 for forming a secured network, according to an example embodiment. As shown in FIG. 12, system 1200 includes a tag reader apparatus 1202, a first device 1230A, a second device 1230B, a third device 1230C, a fourth device 1230D and tag manufacturer database server(s) 1204, and one or more device manufacturer servers 1232. Tag reader apparatus 1202, first device 1230A, second device 1230B, third device 1230C, fourth device 1230D, tag manufacturer database server(s) 1204, and/or device manufacturer database server(s) 1232 may be communicatively coupled via a network a 1210. Tag reader apparatus 1202 and tag manufacturer database server(s) 1204 are examples of tag reader apparatus 902 and tag manufacturer database server(s) 904, as described above with reference to FIG. 9. Accordingly, tag reader apparatus 1202 includes a processing unit 1214, a memory 1216, an antenna 1206, a transceiver 1208, user input component(s) 1218, user output component(s) 1220, and a tag device 1212, which are examples of processing unit 914, memory 916, antenna 906, transceiver 908, user input component(s) 918, user output component(s) 920, and tag device 912, as described above with reference to FIG. 9.

As shown in FIG. 12, first device 1230A includes a tag device 1234A that stores a random identification number (i.e., Tag ID 1236A) that uniquely identifies tag device 1234A, second device 1230B includes a tag device 1234B that stores a random identification number (i.e., Tag ID 1236B) that uniquely identifies tag device 1234B, third device 1230C includes a tag device 1234C that stores a random identification number (i.e., Tag ID 1236C) that uniquely identifies tag device 1234C, and fourth device 1230D includes a tag device 1234D that stores a random identification number (i.e., Tag ID 1236D) that uniquely identifies tag device 1234D. Each of tag devices 1234A, 1234B, 1234C, and 1234D is an example of tag device 600, as shown in FIGS. 6 and 7.

To form a secured network, tag reader apparatus 1202 may be used to read the tag devices included in each of the devices in which the user desires to be included in the network. In the example shown in FIG. 12, the user desires to form a network with first device 1230A, second device 1230B, third device 1230C, and fourth device 1240D. Accordingly, the user activates tag reader application 1224 and successively places tag reader apparatus 1202 within a certain distance (e.g., within 10 cm) of each of first device 1230A, second device 1230B, third device 1230C, and fourth device 12030D to obtain the random identification numbers associated therewith (i.e., Tag ID 1236A, Tag ID 1236B, Tag ID 1236C, and Tag ID 1236D).

Once Tag ID 1236A, Tag ID 1236B, Tag ID 1236C, and Tag ID 1236D are received, tag reader application 1224 may enable the user to activate the network. For example, tag reader application 1224 may display a user-interactive element (e.g., an "Activate" button via user output component(s) 1220), which, when activated (e.g., by touching it on a touchscreen, pointing to it with a mouse and clicking, etc. via input component(s) 1218) causes the identifiers associated with tag reader apparatus 1202 (i.e., Reader ID 1226, App ID 1228, and Tag ID 1212), Tag ID 1236A, Tag ID 1236B, Tag ID 1236C, and Tag ID 1236D to be transmitted to tag manufacturer database server(s) 1204.

As described above in Subsection II.B, tag manufacturer database server(s) 1204 may determine whether tag reader apparatus 1202 is an authorized tag reader apparatus by determining whether Reader ID 1226, App ID 1228, and Tag ID 1212 are stored and associated with each other therein. Tag manufacturer database server(s) 1204 may also determine whether tag devices 1234A, 1234B, 1234C, and 1234D are authenticated by determining whether the Tag ID 1236A, Tag ID 1236A, Tag ID 1236A, and Tag ID 1236A are stored therein. In the event that tag manufacturer database server(s) 1204 determine that the tag reader apparatus 1202 is authorized and tag devices 1234A, 1234B, 1234C, and 1234D are authenticated, tag manufacturer database server(s) 1204 may provide Tag ID 1236A, Tag ID 1236A, Tag ID 1236A, and Tag ID 1236A to device manufacturer database server(s) 1232, which are server(s) that are associated with the manufacturer(s) of first device 1230A, second device 1230B, third device 1230C, and fourth device 1230D. Device manufacturer database server(s) 1232 may include one or more host servers, cloud-implemented components, and/or other host components/infrastructure in embodiments.

Device manufacturer database server(s) 1232 may maintain an association between the tag IDs and the products associated therewith. Using the association, device manufacturer database server(s) 1232 may retrieve instructions associated with the device. The instructions may include one or more authorization codes, one or more configuration steps, etc., that are to be used to automatically form and/or configure a network. In the example shown in FIG. 12, Tag ID 1236A is associated with instructions 1238A, Tag ID 1236B is associated with instructions 1238B, Tag ID 1236C is associated with instructions 1238C, and Tag ID 1236D is associated with instructions 1238D. Instructions 1238A, 1238B, 1238C, and/or 1238D are provided to tag manufacturer database server(s) 1204. In accordance with an embodiment, tag manufacturer database server(s) 1204 provide the instructions 1238A, 1238B, 1238C, and/or 1238D to tag reader apparatus 1202, and tag reader apparatus 1202 provides instructions 1238A, 1238B, 1238C, and/or 1238D to first device 1230A, second device 1230B, third device 1230C, and/or fourth device 1230D. In accordance with another embodiment, tag manufacturer database server(s) 1204 provide instructions 1238A, 1238B, 1238C, and/or 1238D directly to first device 1230A, second device 1230B, third device 1230C, and/or fourth device 1230D.

First device 1230A, second device 1230B, third device 1230C, and fourth device 1230D may use instructions 1238A, 1238B, 1238C, and/or 1238D to automatically form and/or configure a network comprising first device 1230A, second device 1230B, third device 1230C, and fourth device 1230D.

In accordance with an embodiment, the network is a Bluetooth network. In accordance with such an embodiment, instructions 1238A, 1238B, 1238C, and/or 1238D comprise Bluetooth authentication codes and/or pairing steps that first device 1230A, second device 1230B, third device 1230C, and/or fourth device 1230D use and/or implement to automatically pair first device 1230A, second device 1230B, third device 1230C, and/or fourth device 1230D with each other.

In accordance with an embodiment, one of first device 1230A, second device 1230B, third device 1230C, and fourth device 1230D is a master device (also referred to as a "control unit") and the other devices are slave devices. In accordance with such an embodiment, the master device is configured to initiate a wireless connection with the other devices to form the network. For example, suppose that first device 1230A is the master device and second device 1230B, third device 1230C, and fourth device 1230D are slave devices. In this example, first device 1230A may be the only device that receives instructions 1238A, 1238B, 1238C, and/or 1238D from tag reader apparatus 1202 or tag manufacturer database server(s) 1204. First device 1230A may use instructions 1238A, 1238B, 1238C, and/or 1238D to initiate a wireless connection with each of second device 1230B, third device 1230C, and fourth device 1230D. First device 1230A may further provide instructions 1238A, 1238B, 1238C, and/or 1238D to one or more of second device 1230B, third device 1230C, and fourth device 1230D to enable second device 1230B, third device 1230C, and/or fourth device 1230D to be communicatively coupled to each other, along with first device 1230A.

Examples of instructions 1238A, 1238B, 1238C, and/or 1238D include, but are not limited to, one or more steps to place first device 1230A second device 1230B, third device 1230C, and/or fourth device 1230D into a discovery mode, step(s) to perform one or more paging procedures in which a master device (e.g., first device 1230A) pages one or more slave devices (e.g., second device 1230B, third device 1230C, and fourth device 1230D), which in return send a reply containing their device access code (DAC) on an appropriate frequency selected during the discovery mode, step(s) to negotiate one or more authentication codes (e.g., a 4-digit passcode) between the master device and the slave device(s), and/or the authentication codes themselves.

Examples of a master device, include but are not limited to, a home automation hub device (e.g., a Samsung SmartThings™ hub, an Amazon Echo™ device, a Google Home™ device, etc.), a smart thermostat (e.g., a Nest™ device), a home security control panel, a security server, etc. Examples of a slave device, include but are not limited to, security sensors (e.g., a motion detector, a camera, a door/window sensor, etc.), a network device (e.g., a router, a switch, a gateway, a cable modem, computing device(s) (e.g., personal computer(s), tablet(s), laptop(s), smart phone(s), personal digital assistant(s), portable music player(s), handheld gaming device(s), gaming consoles(s), smart television(s), etc.)), a smart appliance (e.g., a smart refrigerator, a smart washer, a smart dryer, a smart microwave, a smart oven, etc.), etc.

Once the network of devices is formed, an association between the devices in the network (e.g., first device 1230A, second device 1230B, third device 1230C, and fourth device 1230D) and tag reader apparatus 1202 may be formed. The association may be maintained by a server (e.g., tag manufacturer database server(s) 1204, device manufacturer database server(s) 1232, and/or another server). For example, the server may maintain an association between Tag ID 1212, Reader ID 1226, and/or App ID 1228 and each of Tag ID 1236A, Tag ID 1236B, Tag ID 1236C, and/or Tag ID 1236D. When another tag reader apparatus (having a different Tag ID, Reader ID and/or App ID) attempts to access the network (e.g., by reading Tag ID 1236A, Tag ID 1236B, Tag ID 1236C, and/or Tag ID 1236D), that tag reader apparatus's Tag ID, Reader ID and/or App ID will be provided to the server, and the server will determine whether that tag reader apparatus is associated with Tag ID 1236A, Tag ID 1236B, Tag ID 1236C, and/or Tag ID 1236D. In the event that the server determines that the other tag reader apparatus is not associated with Tag ID 1236A, Tag ID 1236B, Tag ID 1236C, and/or Tag ID 1236D, a notification indicating that an unauthorized user attempted to access the network may be provided to the user that created the network or another entity permitted to receive such a notification (e.g., a home security company). The notification may also include the Tag ID, Reader ID, and/or App ID associated with the unauthorized tag reader apparatus.

It is noted that while the foregoing examples describe that a Bluetooth network may be formed, other types of networks (e.g., LANs, WANs, virtual private networks (VPNs), enterprise networks, etc. may be formed. Furthermore, although four devices 1230A-1230D are described as being included in the formed network, other numbers of such devices may be included in the formed network, including 10s, 100s, and greater numbers of such devices.

Figure 13:
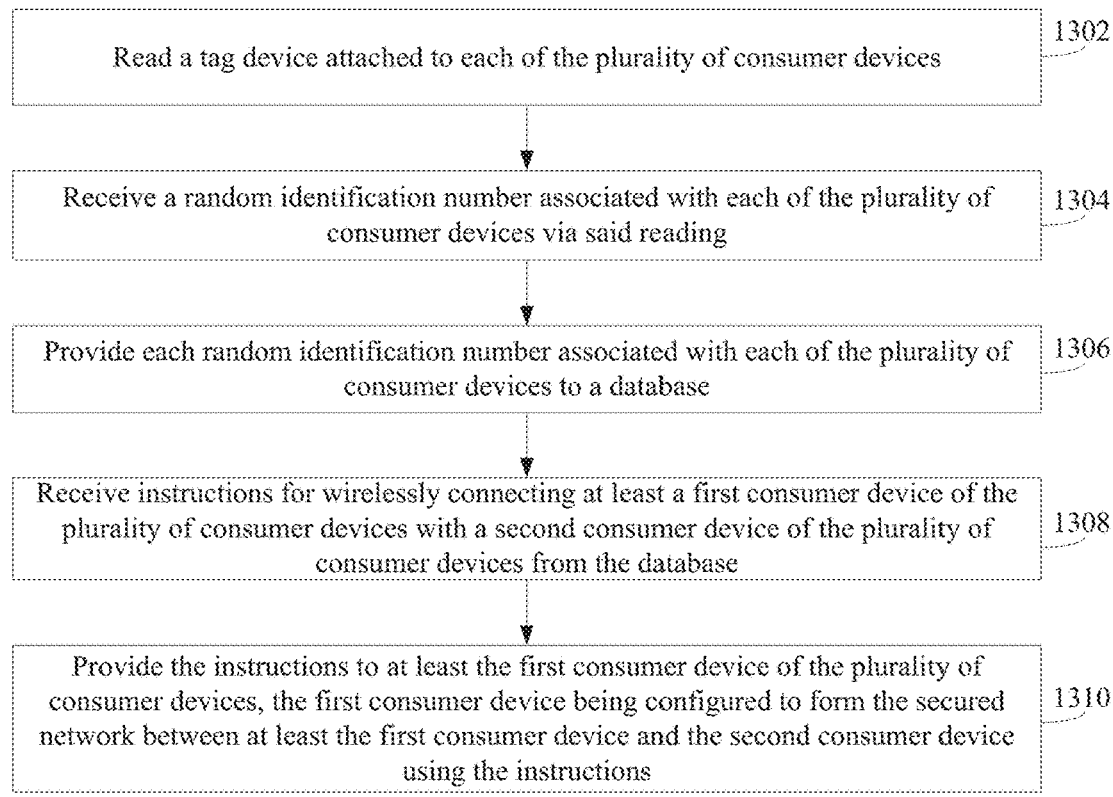
FIG. 13 depicts a flowchart of a method implemented by an authorized tag reader apparatus for forming a secured network comprising a plurality of devices, according to an example embodiment.
Figure 14:
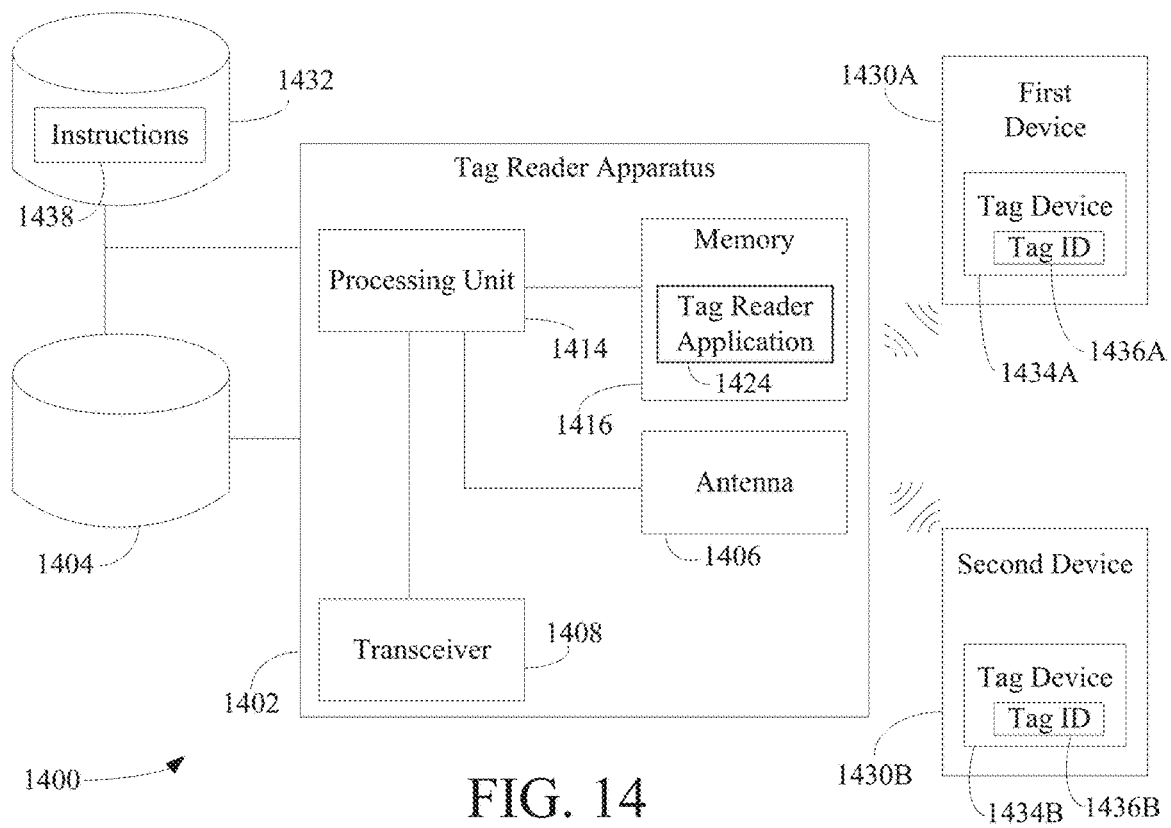
FIG. 14 is a block diagram of a tag reader apparatus coupled to a first device, a second device, tag manufacturer database server(s), and device manufacturer database server(s), according to an example embodiment.

Accordingly, in embodiments, a secured network may be formed in many ways. For example, FIG. 13 depicts a flowchart 1300 of a method implemented by an authorized tag reader apparatus for forming a secured network comprising a plurality of consumer devices, according to an example embodiment. The method of flowchart 1300 may be implemented by tag reader apparatus 1402 shown in FIG. 14. FIG. 14 is a block diagram 1400 of tag reader apparatus 1402 coupled to a first device 1430A, a second device 1430B, tag manufacturer database server(s) 1404 and device manufacturer database server(s) 1432, according to an example embodiment. Tag reader apparatus 1402, first device 1430A, second device 1430B, tag manufacturer database server(s) 1404 and device manufacturer database server(s) 1432 are examples of tag reader apparatus 1202, first device 1230A, second device 1230B, tag manufacturer database server(s) 1204 and device manufacturer database server(s) 1232, as described above with reference to FIG. 12. Tag reader apparatus 1402 includes a processing unit 1414, a transceiver 1408, an antenna 1406, and a memory 1416, which are examples processing unit 1214, transceiver 1208, antenna 1206, and memory 1216, as described above with reference to FIG. 12. Other components (e.g., user input component(s) 1218 and user output component(s) 1220) are not described for the sake of brevity. First device 1430A includes a tag device 1432A that stores a Tag ID 1434A, and second device 1430B includes a tag device 1432B that stores a Tag ID 1434B. Tag device 1432A, tag device 1432B, Tag ID 1436A, and Tag ID 1436B are examples of tag device 1232A, tag device 1232B, Tag ID 1236A, and Tag ID 1236B, as described above with reference to FIG. 12. Other structural and operational examples will be apparent to persons skilled in the relevant art(s) based on the following discussion regarding flowchart 1300 and block diagram 1400.

Flowchart 1300 begins with step 1302. At step 1302, a tag device attached to each of the plurality of consumer devices is read. For example, with reference to FIG. 14, tag reader apparatus 1302 may be placed in proximity to each of first device 1430A and second device 1430B, and processing unit 1412 may activate antenna 1406, thereby enabling antenna 1406 to read tag device 1434A and 1434B.

At step 1304, a random identification number associated with each of the plurality of consumer devices is received via the reading step of step 1302. For example, with reference to FIG. 14, antenna 1406 receives Tag ID 1436A and Tag ID 1436B.

At step 1306, each random identification number associated with each of the plurality of consumer devices is provided to a database. For example, with reference to FIG. 14, transceiver 1508 may provide Tag ID 1436A and Tag ID 1436B to tag manufacturer database server(s) 1404, which, in turn, provides Tag ID 1436A and Tag ID 1436B to device manufacturer database server(s) 1432.

At step 1308, instructions for wirelessly connecting at least a first consumer device of the plurality of consumer devices with a second consumer device of the plurality of consumer devices is received from the database. For example, with reference to FIG. 14, transceiver 1508 receives instructions 1438 from device manufacturer database server(s) 1432. Instructions 1438 may be used to wirelessly connect first device 1430A with second device 1430B.

In accordance with one or more embodiments, the instructions comprise one or more Bluetooth authentication codes.

At step 1310, the instructions are provided to at least the first consumer device of the plurality of consumer devices. The first consumer device is configured to form the secured network between at least the first consumer device and the second consumer device using the instructions. For example, with reference to FIG. 14, transceiver 1408 provides instructions 1438 to first device 1430A, and first device 1430 implements instructions 1438 to form the secured network between first device 1430A and second device 1430B.

Figure 16:
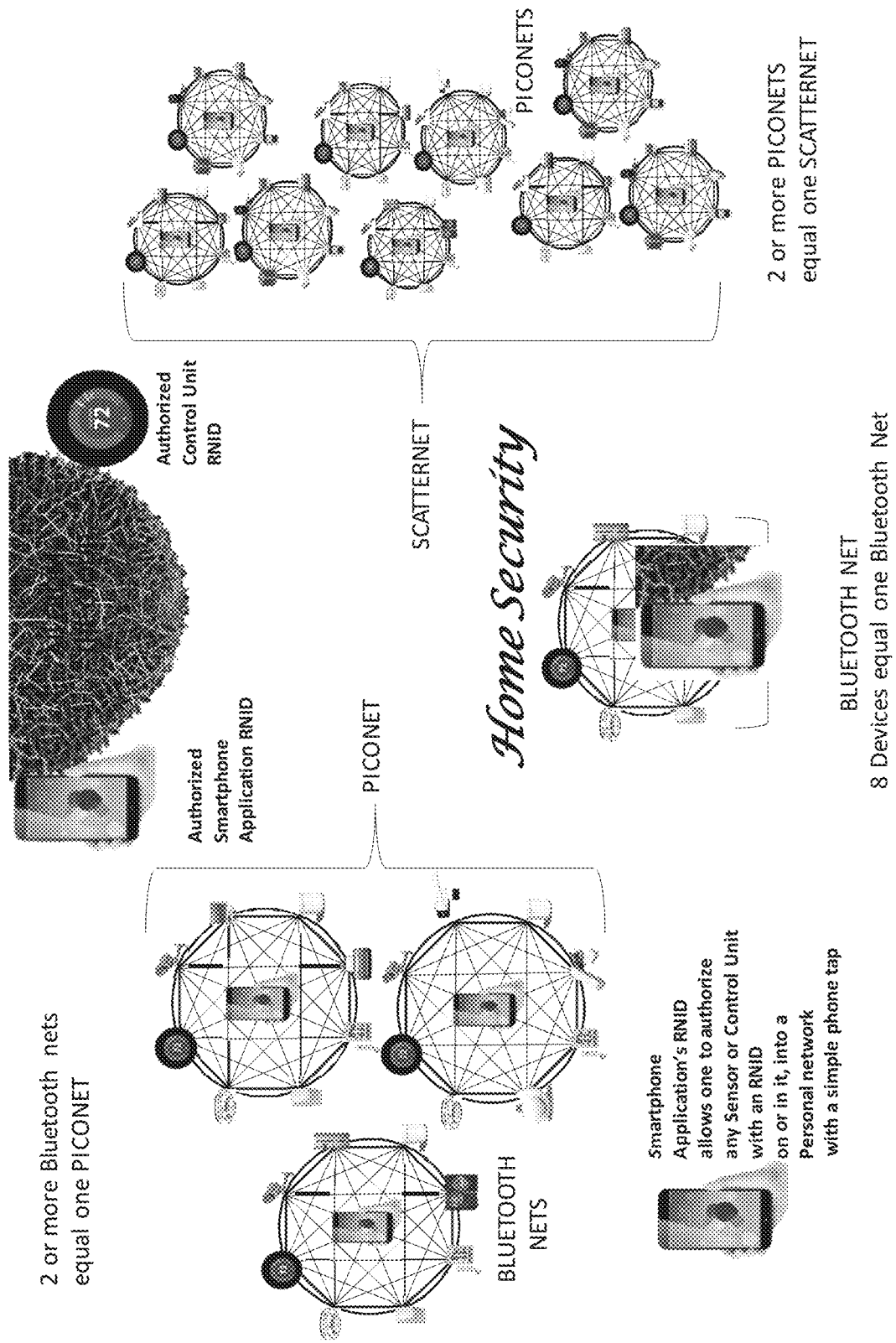
FIG. 16 shows a block diagram of an example secured Bluetooth network, according to an example embodiment.
Figure 17:
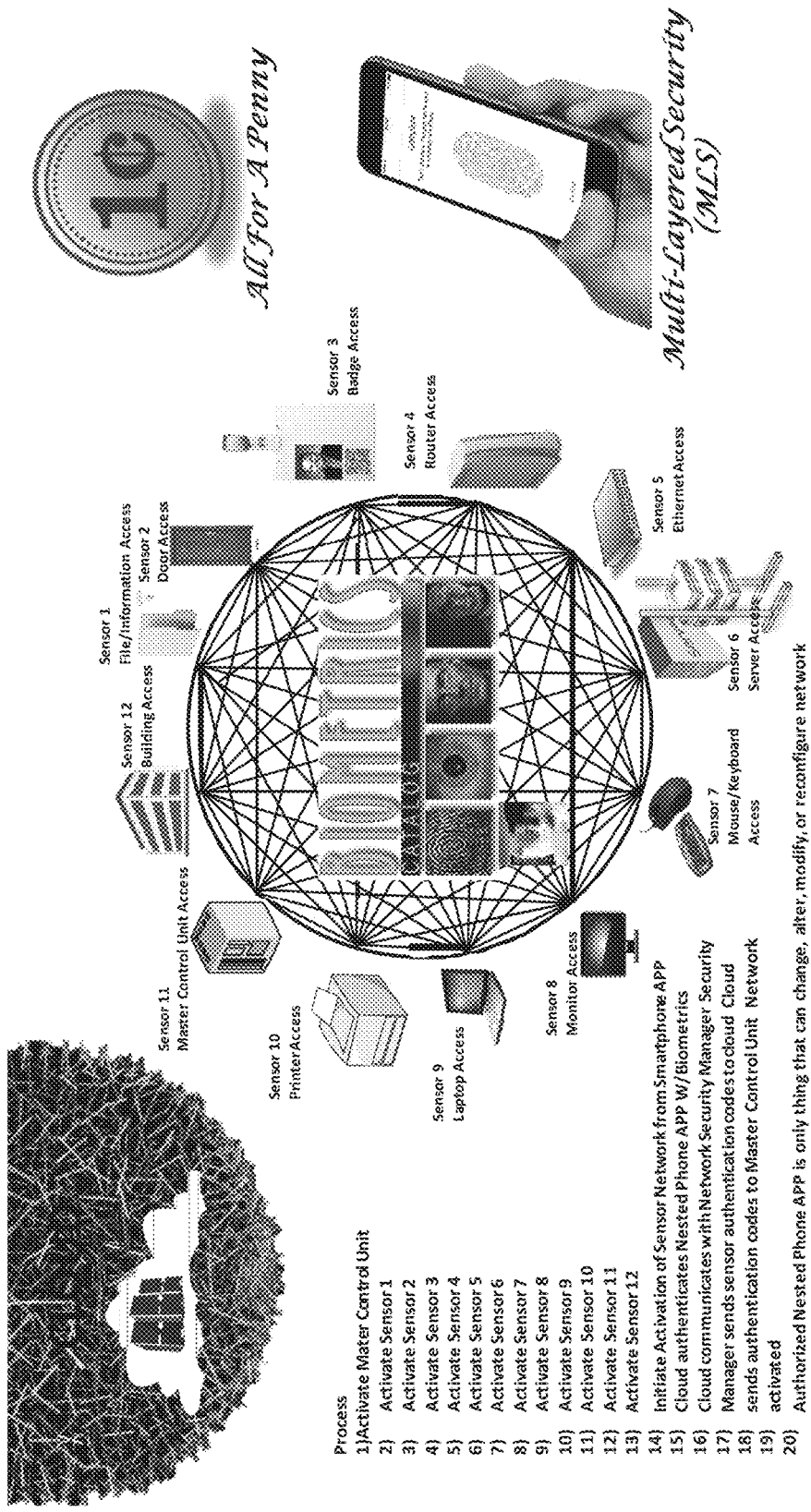
FIG. 17 shows a block diagram of an example secured LAN, according to an example embodiment.

In accordance with one or more embodiments, the secured network comprises at least one of a Bluetooth network, a LAN, or a WAN. For example, FIG. 16 shows a block diagram 1600 of an example secured Bluetooth network, according to an example embodiment. FIG. 17 shows a block diagram 1700 of an example secured LAN, according to an example embodiment.

In accordance with one or more embodiments, the first device is a master device and the second device is a slave device. For example, with reference to FIG. 14, first device 1430A is a master device and second device 1430B is a slave device.

In accordance with one or more embodiments. The master device is configured to initiate a wireless connection with the slave device using the instructions. For example, with reference to FIG. 14, first device 1430A implements instructions 1438 to initiate a wireless connection with second device 1430B.

In accordance with one or more embodiments, the master device comprises a home automation hub device, and the slave device comprises at least one of a security sensor, a home appliance, a computing device, or a network device.

D. Further Embodiments and Environments

Figure 18:
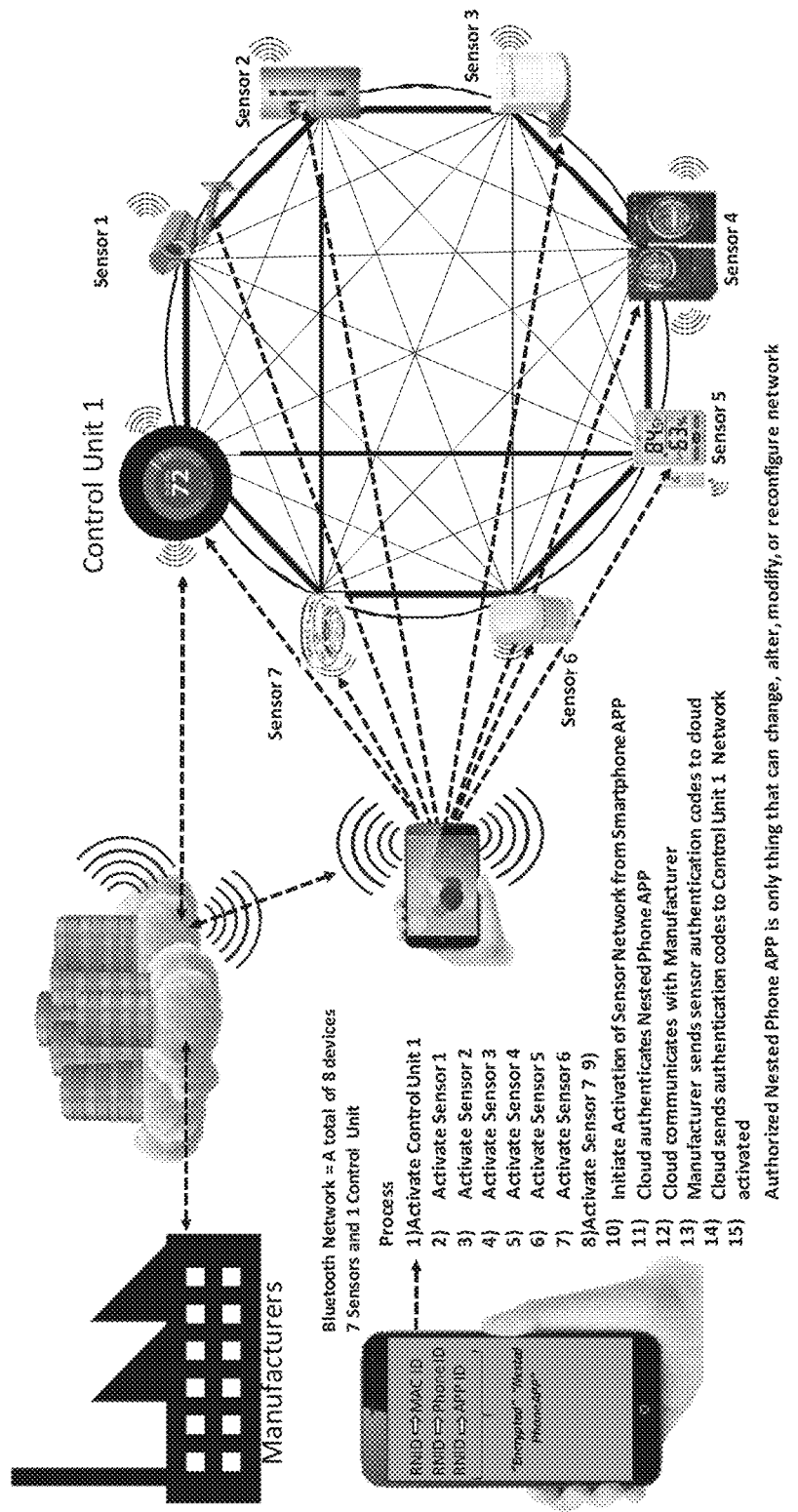
FIG. 18 shows a block diagram of a network formed with devices that each comprise a RFID/NFC tag, according to an example embodiment.
Figure 19:
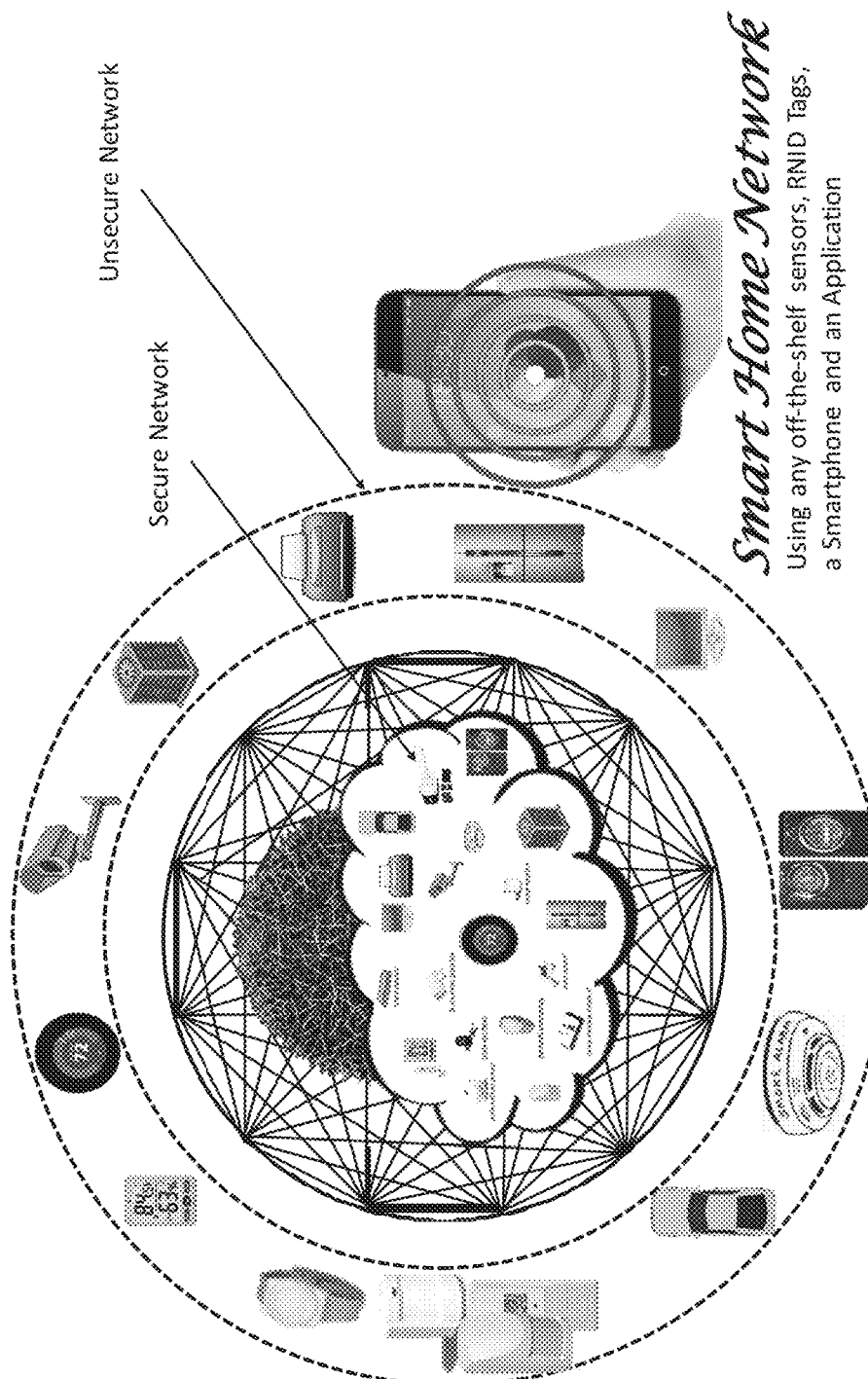
FIG. 19 shows a block diagram of a smartphone that is placed in proximity to a plurality of devices to obtain the random number IDs therefrom, which causes the ID of the smartphone to be authenticated, according to an example embodiment.

Methods, systems and apparatuses for cloud-based reconfigurable wireless sensor network(s) using Near Field Communication (NFC) tags with random number IDs are disclosed herein. The random number IDs of RFID/NFC tags attached or imbedded to every type of sensor manufacturer are used to create the network. For example, FIG. 18 shows a block diagram 1800 of a network formed with devices that each comprise a RFID/NFC tag, according to an example embodiment. By simply tapping the smartphone to any sensor tag (i.e., tag device) (e.g., touching the sensor tag with the smartphone, interacting with an interface element (e.g., a button) of the smartphone that causes a communication between the smartphone and the sensor tag, etc.), its unique ID is authenticated within the cloud and then to the sensor's manufacturer. For example, FIG. 19 shows a block diagram 1900 of a smartphone that is placed in proximity to a plurality of devices to obtain the random number IDs therefrom, which causes the ID of the smartphone to be authenticated, according to an example embodiment. Pertinent technical information for all sensors and IDs are then assimilated into the new sensor network. A physical sensor control unit which also can be the interface to the cloud through its own unique ID through the cloud can interface with the individual sensor's downloads and authenticates the final network. At any time, any network can be reconfigured with a simple tap of an authorized smartphone reader. Once a network is configured, then any control unit module (e.g., master device) within the network can then be authorized to interface to any smart device (i.e., washers, dryers, refrigerators, HVAC systems, utilities, security systems, smart home systems, cars, medical devices, etc.). Each and every device is completely secure within the network using simply a smartphone and tag with a random ID Read Only Memory (ROM) RFID/NFC/tag(s). These three things form the personalized/unique reconfigurable sensor network. The individual secure authentication interface and reconfigurability between any individual sensor, sensor to sensor or sensor to sensors are completely handled through the cloud and then communicated to the control unit as to what action or reaction is required. Any change to the secure network can be completed by the original authorized smartphone that setup the network.

In accordance with an embodiment, a plurality of RFID/NFC sensor/tag(s) are configured or imbedded into items to be interrogated via their unique ID(s) and NFC enabled smartphones (i.e., "Authorized Readers"). Furthermore, the readers communicate with one or more cloud networks which can be configured or reconfigured. Each of the readers include a unique MAC ID number which identifies that particular reader within a reader network during communications. Each reader includes a network interface module and an optimization module to receive and process statistical, state, and other data obtained from other readers in the network. Embodiments disclosed herein include a primary/secondary reader network configuration, as well as a distributed elements reader network configuration. A set of operational rules for the environment is indicated, and tag interrogations are optimized according to the rules. Smartphones may communicate via an application according to a Listen Before Talk (LBT) protocol, which would avoid undesirable interference. Individual smartphones are capable of dynamically establishing and joining a network and leaving the network in a self-configured and semiautonomous or autonomous manner.

Figure 20:
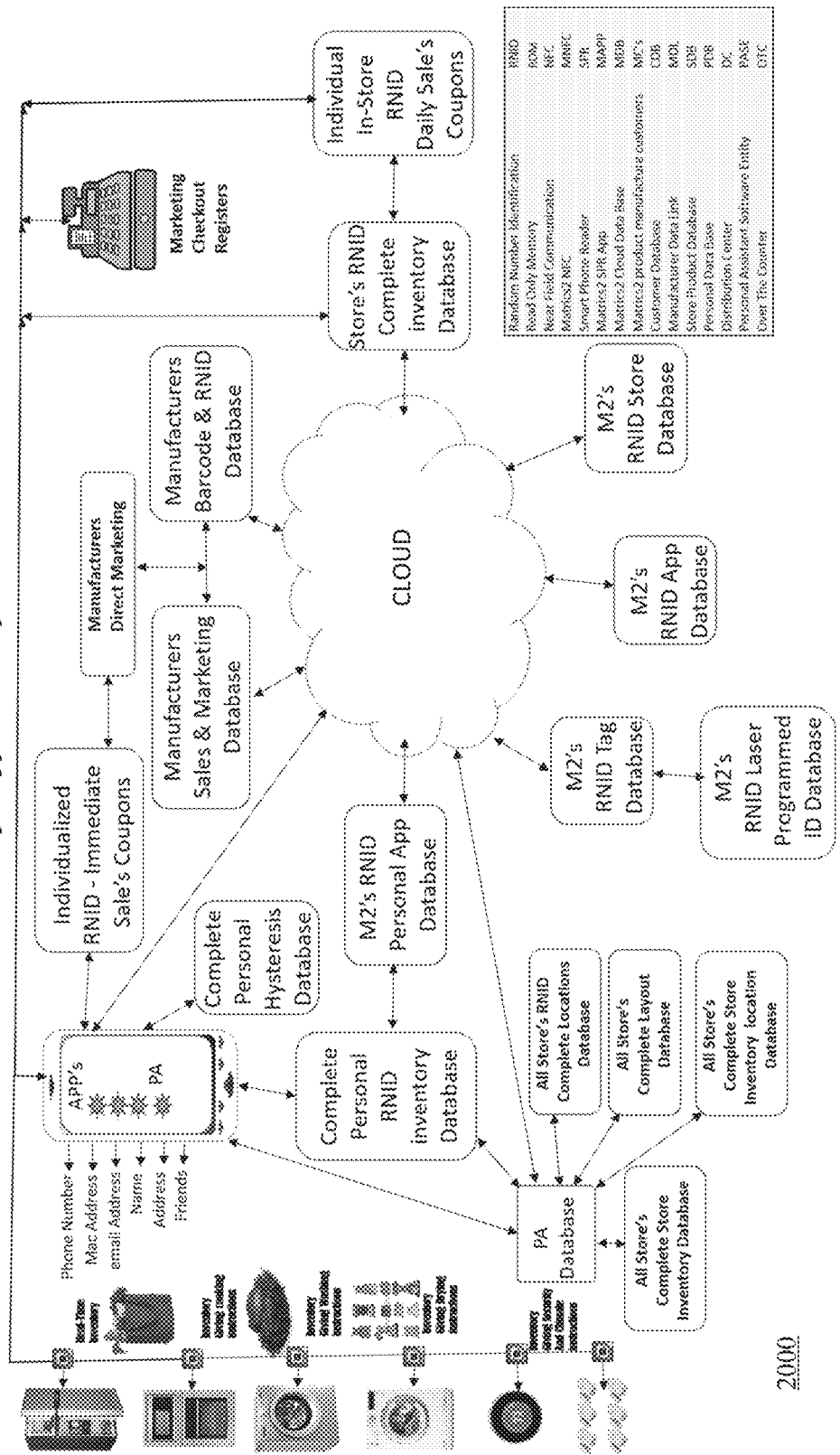
FIG. 20 shows a block diagram of a system that comprises a plurality of devices that are securely connected wirelessly, according to an example embodiment.

Embodiments described herein are also directed to incorporating RNID (Random Number Identification) tags onto or into any "smart" product(s), which in themselves have an ability for some kind of action or reaction to a command, prompt or signal. Examples of products include, but are not limited to, electronics, such as one or more smartphones, one or more computers, one or more printers, one or more routers, one or more Ethernet-based devices, one or more servers, one or more sensors, one or more control devices, one or more modems, one or more WIFI-based devices, one or more headsets, one or more speakers, one or more vehicles, or even electronic folders or files. With this process, anything and everything can or could be securely connected wirelessly through the RNID system described herein, and each and every item may be authenticated and/or verified either individually, collectively, and/or all at the same time. For example, FIG. 20 shows a block diagram 2000 of a system that comprises a plurality of devices that are securely connected wirelessly, according to an example embodiment.

The Return on Investment (ROI) to the manufacturer of these products is that they can instantly respond to their interested customers and allow for follow-up requests as needed. This will all happen anonymously because not one manufacturer knows anything but the MAC address/RNID of the reader, and there is no personal information ever associated with any phone, only the random numbers and a Media Access Control (MAC) address of the authorized phone. The ROI to the customer is complete privacy, security, authentication and product authenticity. There is another ROI for the customer as well, and that is enabling the customer to get any further information about the product he or she may desire or require. The ROI for the manufacturer of the tags and/or system disclosed herein is (1) the tag revenue from each tag; (2) the revenue from the product database authentication; and (3) the revenue from the direct marketing response from the manufacturers, as well as other possible business service models.

Embodiments described herein enable anything and everything to be securely networked, connected, configured or reconfigured either wired or wirelessly through the RNID system described herein and allow each and every item to be authenticated, and verified individually, collectively, or all at the same time, using an authorized NFC enabled Smartphone or RFID reader.

Embodiments described herein are also described for managing, configuring and reconfiguring multiple devices within a network using a laser programmed random generated number, Read Only Memory (ROM) ID (RNID), which gives each and every die on each and every wafer a one-time digital unique ID or fingerprint. All NFC/RFID tags are then attached onto or into any "smart" product(s) or devices, that in themselves have an ability for some kind of action or reaction to a command, prompt or signal. Each manufacturer's device is marked or labeled with some type of unique product ID (e.g., the model no., serial number, and/or a barcode), which at the time it is manufactured is applied. If the device has no unique ID, one can be added later. Then, with an authorized NFC enabled smartphone, the device can become registered using the RNID tag applied to the device and the manufacturer's unique product ID. These two IDs now become a single digital unique ID as a fingerprint to every device or the plurality of devices at the time they are manufactured. Every device ID then has a two-part fingerprint code.

The authentication and/or validation process of each of these silicon wafers are securely programmed into every single wafer die during manufacturing. Each of those unique RNIDs are automatically entered into the cloud database at that time. Each unique die is then attached to its own antenna and then read and authenticated at the time the tags are manufactured. Once authenticated, they are registered as a one-time digital unique tag ID (its "forever" fingerprint) in the secure database. The IDs/dies that fail in the manufacturing process are taken out of the active inventory and designated as non-active IDs.

Once authenticated, they are ready to be attached to any "smart" device or the plurality of "smart" devices by any manufacturer at any time of their lifecycle. Upon the completion of attaching these tags to devices, their unique RNID is then linked (e.g., forever) with each and every product or device as a split ID, which allows the manufacturer the ability to use one or both IDs for authentication purposes.

The ability to create a non-standards-based reconfiguring capability of any network with any device or the plurality of devices is enabled in accordance with the embodiments described herein. The reconfiguring comprises at least one of a physical reconfiguration of a mode of operation of the device through the cloud, via any combination of: NFC enabled smartphone(s), smartphone application(s), firmware, and RNID tag(s).

The plurality of devices comprises a plurality of sensors. Location information of at least some of the plurality of sensors may be obtained and the location information may be stored in the cloud via any combination of: NFC enabled smartphone(s), smartphone application(s), firmware, and RNID tag(s).

The reconfiguration of the mode of operation of the device(s) may include reconfiguration of at least one of a behavior, output data allocation, or an ownership of the device through the cloud, via any combination of: NFC enabled smartphone(s), smartphone application(s), firmware, and RNID tag(s).

The reconfiguration of the behavior of the device may comprise reconfiguration of at least one of functionality, a calibration, or an output quality of the device, and wherein reconfiguration of the functionality of the device comprises modifying at least one of a type or a quality of an output of the device through the cloud via any combination of: NFC enabled smartphone(s), smartphone application(s), firmware, and RNID tag(s).

The reconfiguration of the ownership of the device may comprise allowing a temporary ownership such as renting (including physical renting or renting of data provided by the device through the cloud) via any combination of: NFC enabled smartphone(s), smartphone application(s), firmware, and RNID tag(s).

The reconfiguration of the calibration of the device may comprise recalibrating the device based on data provided by one or more other devices of the plurality of device through the cloud, via any combination of: NFC enabled smartphone(s), smartphone application(s), firmware, and RNID tag(s).

The authenticating and validating of the device may comprise facilitating authentication and validation of the device within a network or cloud environment using any combination of: NFC enabled smartphone(s), smartphone application(s), firmware, and RNID tag(s). The authentication and validation of the device is revocable.

Ownership of or transferring ownership of a device of the plurality of devices may remotely revoked. The associating a device of the plurality of devices with other devices or changing association of the device with one or more of the other devices by a registrar based on one or more policies through the cloud may be performed via any combination of: NFC enabled smartphone(s), smartphone application(s), firmware, and RNID tag(s).

The registering of at least one of the digital fingerprint/DNA and the authenticating and validating, or reconfiguring of the device of the plurality of devices may be self-performed by the device or the plurality of devices all through the cloud via any combination of: NFC enabled smartphone(s), smartphone application(s), firmware, and RNID tag(s).

RNID (Random Number Identification) tags onto or into any "smart" product(s) have an ability for some kind of action or reaction to a command, prompt or signal. As for example, electronics comprise smartphone(s), computer(s), printer(s), router(s), Ethernet-based device(s), server(s), sensor(s), control device(s), modem(s), WIFI-based device(s), headset(s), speaker(s), vehicle(s), or even electronic folders or files. With this process, anything and everything can or could be securely connected wirelessly through the RNID system described herein and each and every item is allowed to be authenticated and verified either individually, collectively, or all at the same time.

The RNIDs may be used to create interoperability between the following general standards: (1) for images deployed in the cloud. This is important in both public and private cloud applications because it influences the work needed to move an application or component between cloud implementations; (2) for the management interfaces between users and cloud services; and (3) for the architecture and interfaces of cloud components.

A system for managing and reconfiguring a plurality of NFC/RFID tagged devices in a network is further described herein. The system includes an NFC enabled smartphone device configured to register random number Read Only Memory (ROM) laser programmed NFC/RFID tags. Such registration includes registering a one-time digital unique ID as a fingerprint/DNA to any device or the plurality of devices by the manufacturer at the time it is manufactured. The system further includes two or more NFC enabled smartphone device(s) configured to authenticate and validate the device or the plurality of devices based on the random number ROM laser programmed NFC/RFID tags.

Figure 21:
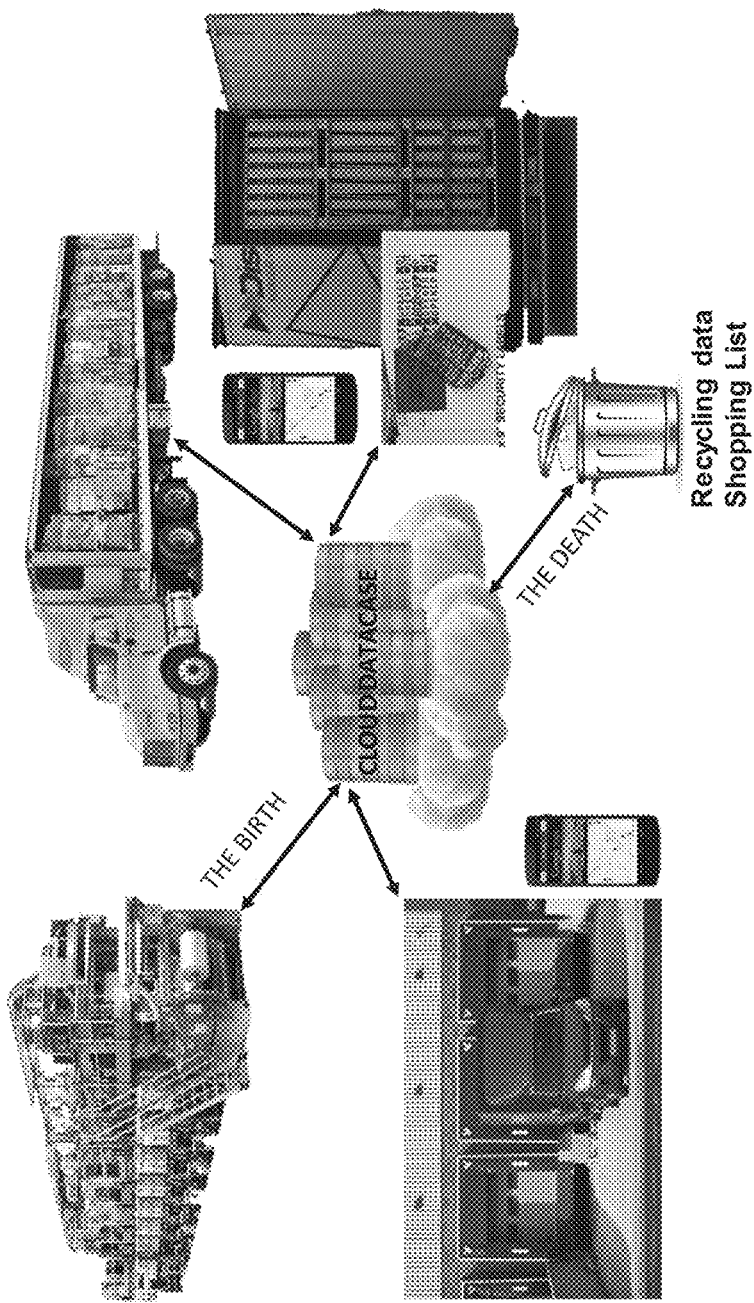
FIG. 21 shows a block diagram depicting a tag device that is attached to a shipping manifest, according to an example embodiment.
Figure 22:
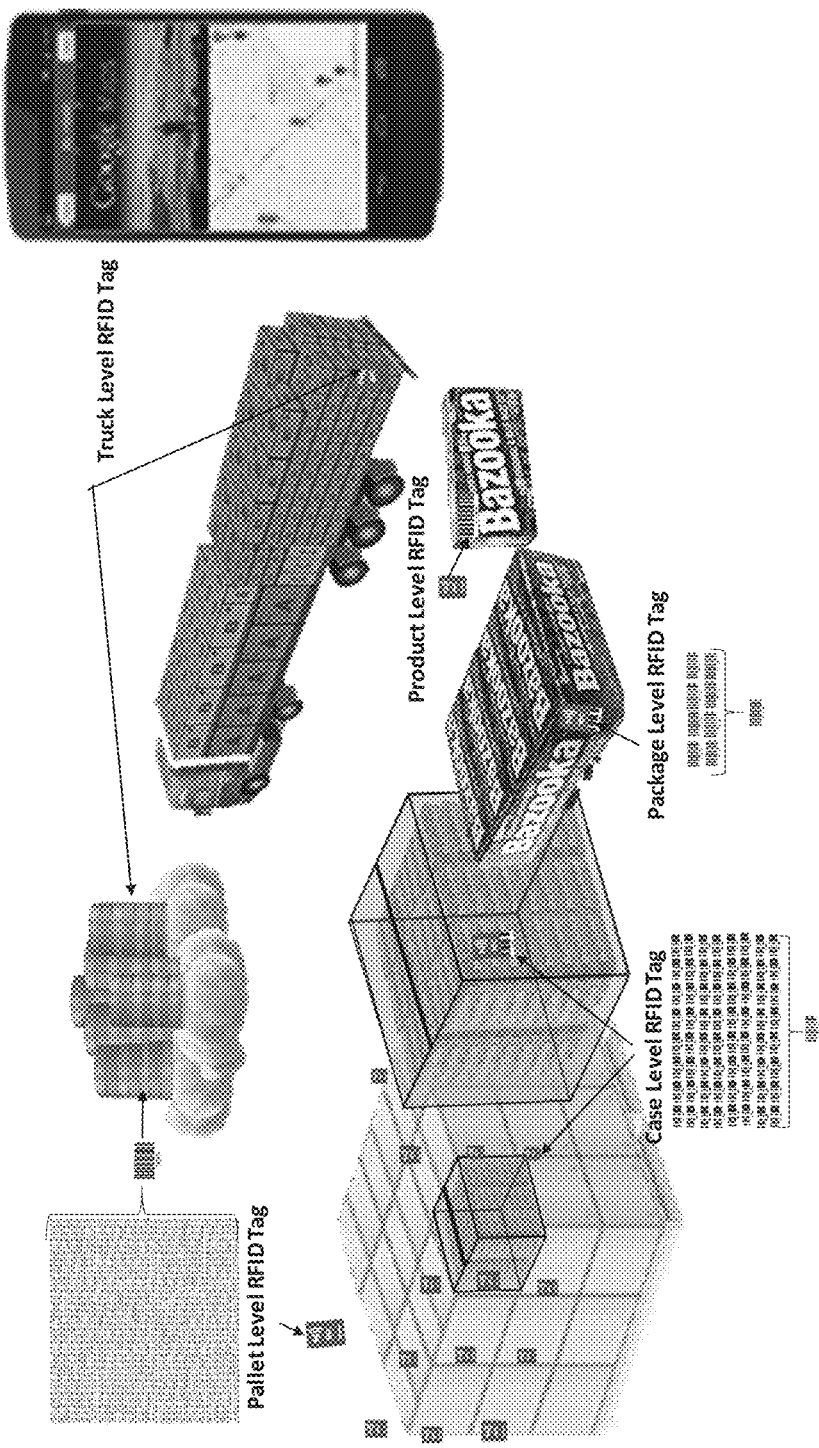
FIG. 22 shows a block diagram depicting tag devices that are attached to a plurality of different objects, according to example embodiments.

The plurality of devices may comprise a plurality of sensors, wherein the network enables the Intelligence of Things (IoT) giving a unique heartbeat to everyday inanimate devices or objects, wherein the functionalities of at least two of the first, second, or third or more devices or devices are combined and performed by NFC enabled phone(s) through the cloud via any combination of: NFC enabled smartphone(s), smartphone application(s), firmware, and RNID tag(s). For example, FIGS. 21 and 22 show block diagrams 2100 and 2200 depicting tag devices are that are attached to a plurality of different objects (e.g., a shipping manifest, a pack of bubble gum, a container containing the packs of bubble gum, a box containing the containers of bubble gum, a pallet containing the boxes of bubble gum, etc.), according to example embodiments.

The system may be further configured to obtain location information of at least some of the plurality of sensors and to store the location information through a NFC enabled smartphone's GPS capability, wherein three or more devices are configured to perform reconfiguration of the mode of operation of the device by reconfiguring at least one of a behavior, output data allocation, or an ownership of the device(s) through the cloud, via any combination: NFC enabled smartphone(s), smartphone application(s), firmware, and RNID tag(s).

The third or more devices may be configured to perform reconfiguration of the behavior of the device(s) by reconfiguring at least one of functionality, a calibration, or an output quality of the device(s). Each third or more devices are configured to perform reconfiguration of the functionality of the device(s) by modifying at least one of a type or a quality of an output of the device(s) through the cloud, via any combination of: NFC enabled smartphone(s), smartphone application(s), firmware, and RNID tag(s).

The third device may be configured to perform reconfiguration of the ownership of the device by allowing a temporary ownership such as renting (including physical renting or renting of data provided by the device through the cloud) via any combination of: NFC enabled smartphone(s), smartphone application(s), firmware, and RNID tag(s).

The third device may be configured to perform reconfiguration of the calibration of the device by recalibrating the device based on data provided by one or more other devices of the plurality of device through the cloud, via any combination of: NFC enabled smartphone(s), smartphone application(s), firmware, and RNID tag(s).

The two or more devices may be configured to perform authentication and validation of the device(s) by facilitating authentication and validation of the device(s) using any combination of: NFC enabled smartphone(s), smartphone application(s), firmware, and RNID tag(s). The authentication and validation of the device may be revocable.

The system may further comprise a registrar that is configured to remotely revoke ownership of or to transfer ownership of a device of the plurality of devices, to associate a device of the plurality of devices with other devices, or to change association of the device with one or more of the other devices based on one or more policies. The registrar may comprise at least one of the first or the second devices all through the cloud, via any combination of: NFC enabled smartphone(s), smartphone application(s), firmware, and RNID tag(s).

The device of the plurality of devices may be configured to self-perform at least one of registering the digital fingerprint/DNA to, authenticate and validate, or reconfiguring the device or the plurality of devices are self-performed through the cloud, via any combination of: NFC enabled smartphone(s), smartphone application(s), firmware, and RNID tag(s).

A system for managing and reconfiguring a plurality of devices within a network is also described herein. The system may include a memory (e.g., a multi-bit programmed random number ROM ID on a NFC/RFID die attached to an NFC or RFID tag antenna and configured to be interrogated by an NFC enabled smartphone), an antenna (e.g., an NFC/RFID antenna), a reader device (e.g., any NFC/RFID smartphone or device), a software application (e.g., authenticated interface software or firmware application either imbedded within a reader or downloaded from an approved site, and a cloud. The cloud may be associated with a database certificate based by a private multi-bit programmed random number ROM ID on a NFC/RFID die attached to an NFC tag, as well as an assigned software application. The authentication and validation of any device or plurality of devices and software may be based on this multi-bit programmed random number ROM ID. The reconfiguring of any device or plurality of devices may be completed within the cloud (e.g., using logical reconfiguration or physical reconfiguration of a mode of operation of the device or the plurality of devices).

The reconfiguration of the mode of operation of the device(s) may include reconfiguration of at least one of a behavior, output data allocation, or an ownership of the device(s). Reconfiguration of the behavior of the device(s) may comprise reconfiguration of at least one of functionality, a calibration, or an output quality of the device(s). Reconfiguration of the functionality of the device(s) may comprise modifying at least one of a type or a quality of an output of the device(s). Reconfiguration of the ownership of the device(s) may comprise allowing a temporary ownership such as renting (including physical renting or renting of data provided by the device(s)). The reconfiguration of the calibration of the device(s) may comprise recalibrating the device(s) based on data provided by one or more other devices of the plurality of device(s). The present description relates generally to any electronic device or sensor(s), and more particularly, but not exclusively, to any sensor management system(s) in creating the ability to create the intelligence of things within the Internet of Things (IOT) network.

RNID (Random Number Identification) tags on or in any "smart" product(s) have an ability for some kind of action or reaction to a command, prompt or signal. As for example, electronics comprise smartphone(s), computer(s), printer(s), router(s), Ethernet-based device(s), server(s), sensor(s), control device(s), modem(s), WIFI-based device(s), headset(s), speaker(s), vehicle(s), or even electronic folders or files. With this process, anything and everything can or could be securely connected wirelessly through the RNID system described herein and each and every item is allowed to be authenticated and verified either individually, collectively, or all at the same time.

The RNIDs may be used to create interoperability between the following general standards: (1) for images deployed in the cloud. This is important in both public and private cloud applications because it influences the work needed to move an application or component between cloud implementations; (2) for the management interfaces between users and cloud services; and (3) for the architecture and interfaces of cloud components.

The process of manufacturing the tags is now described. First, each and every die may be uniquely programmed with at least a 64-bit RNID at the wafer level. In accordance with an embodiment, the wafer is a 300 mm (12 in.) wafer, which contains approximately 1.5M 200 $\mu m^2$ die. Each of these RNID's may be laser programmed into each die as a read only memory (ROM), which can never be altered or changed.

Next, a 300 mm diameter adhesive may be applied, which may be an adhesive with anisotropic capabilities. Once the adhesive is firmly applied, the wafers are then singulated into individual dies, which are then individually attached to a respective antenna (e.g., via an anisotropic adhesive). Once a tag is attached to an antenna, each completed tag is then individually authenticated by an "Authorized Reader". This authentication process automatically stores each laser-programmed ID into a "world tag database."

An exemplary authorized reader is now described. During the manufacturing process of a smart phone, a unique MAC address is assigned thereto, most often assigned by the manufacturer with a network interface controller (NIC). The MAC address is stored its hardware, such as the card's read-only memory or some other firmware mechanism.

Also during the manufacturing process, the RNID tag would also be imbedded into or inside the phone. The tag may be near the NFC antenna inside the phone. At the time where each phone's functionality tests are performed, the phone's Bluetooth functionality would be enabled, and the NFC reader would be allowed to read its own RNID tag and send authentication of that tag, as well as its MAC address, to the world tag database. At that time the two are forever linked together.

After each and every smartphone's MAC address and smartphone's RNID are linked forever for eternity into the world tag database, a final process is performed in order for the smartphone to be considered an "authorized" smartphone. In particular, the smartphone is either imbedded (e.g., firmware) with a special application or have had downloaded a software application made and/or controlled by the manufacturer of the tags. These software/firmware applications may have an imbedded preamble attached or hidden within its architecture. Thereafter, the smartphone may be considered to be an authorized reader or a nested system.

The authorized, nested read system may comprise the smartphone's RNID, MAC address and/or the smartphone application's RNID. One or more of these may be combined together forever as an authorized system within the world tag database. During any routine authentication process, the nested RNID's may be authenticated in real-time to determine whether it is an authorized RNID system. If an RNID system is not authenticated, it is immediately rejected as an unapproved product from any of its specific manufacturers.

The world tag database is described as follows. The world tag database may be a real-time authentication system that continually authenticates every RNID ever manufactured to each and every RNID read in the field (Outside of manufacturing) by an "Authorized Reader". Upon authentication, the data or authentication codes are sent out to each manufacturer so that they can look-up the RNID and what product information that RNID represents. Then the manufacturers can, if desired, directly respond back to that data with either coupons, product/marketing information, security data, warranty information, etc. Each RNID response from the manufacturer(s) then comes back into the world tag database and then directly sent back out to the original "Authorized Reader interrogator". Each authentication within the database (e.g., either pre- and post-authentication) are handled individually as a charge event or with surcharges depending on the amount of data required or requested.

Whenever a manufacturer orders a lot of completed RNID tags, pre-authenticated RNID tags are shipped thereto. As stated earlier, real-time database record of each and every RNID's ever manufactured is maintained. This enables every tag read in the field can be pre- or post-authenticated. In accordance with an embodiment, the process for each manufacturer would be to apply, attach or imbed each RNID tag onto or into any electronic device(s) during the time of its manufacturing birth, or any time prior to being packaged, shipped, purchased or used. Once a tag has been read, authenticated and entered into the world tag database, the world tag database allows that association of the RNID(s) to its authorized manufacturers list of ID's. This is all done invisibly behind the curtain and is nearly real-time to the manufacturer and interrogator (Authorized Tag Reader). The manufacturer's item level databases or any item in which they have an RNID number assigned thereto is not maintained. This is only because it is usually the responsibility for each and every manufacture to maintain their own RNID's product database, and to what those product ID's are associated to (i.e., a barcode or product identifier). However, if desired or needed, they can also be maintained. These associated ID's can also later be linked to various databases, and/or other specific device(s) specs, warranty information or even allow for a wireless connection between "smart devices".

One example of this would be Bluetooth secure codes for connecting to specific Bluetooth devices, which may or may not be in discovery mode. When any device tag is read by an authorized NFC smart phone reader, the retrieved tag RNID is sent to the manufacturer's database, where the unique manufacturer RNID is obtained. The obtained unique manufacturer RNID could be used to access any specific tag RNID/product information data base, and the device specifications. One example of this would be a number of preset steps needed to be performed in order to set up a connection between any two Bluetooth devices. First, each device is placed into discovery mode. This may be done using an inquiry process, which hops through a specified subset of all frequencies to find the devices that are discoverable. The device then retrieves the 48-bit unique MAC address and the internal clock-offset. After this discovery has completed, a paging procedure is started to set up a connection. The master device (Control Unit) pages the slave device, which in return sends a reply containing its Device Access Code (DAC) on the appropriate frequency selected by the page response hopping sequence. The slave will then switch to the master's channel parameters, by which a link is established and data can be exchanged. Most often this is done in the form of pairing. Pairs of devices negotiate a link key, a shared secret with which cryptographic authentication takes place. The stream of data may then be encrypted to prevent any successful eavesdropping. This all can be downloaded for the appropriate Smartphone menu action. Any attempt to enter the new secure connection without an authorized Smartphone with an authorized Application may trigger an event log and activate an alarm. For instance, an intruder goes to a door sensor and tries to access the network sensor with an NFC reader. The tag is automatically read and authenticated as an authorized sensor, but with an unauthorized reader. The software or firmware automatically logs an event and cause to action.

III. Example Computer Implementations

A device, as defined herein, is a machine or manufacture as defined by 35 U.S.C. § 101. That is, as used herein, the term "device" refers to a machine or other tangible, manufactured object and excludes software and signals. Devices may include digital circuits, analog circuits, or a combination thereof. Devices may include integrated circuits (ICs), one or more processors (e.g., central processing units (CPUs), microprocessors, digital signal processors (DSPs), etc.) and/or may be implemented with any semiconductor technology, including one or more of a Bipolar Junction Transistor (BJT), a heterojunction bipolar transistor (HBT), a metal oxide field effect transistor (MOSFET) device, a metal semiconductor field effect transistor (MESFET) or other transconductor or transistor technology device. Such devices may use the same or alternative configurations other than the configuration illustrated in embodiments presented herein.

A device, as defined herein, is a machine or manufacture as defined by 35 U.S.C. § 101. That is, as used herein, the term "device" refers to a machine or other tangible, manufactured object and excludes software and signals. Devices may include digital circuits, analog circuits, or a combination thereof. Devices may include integrated circuits (ICs), one or more processors (e.g., central processing units (CPUs), microprocessors, digital signal processors (DSPs), etc.) and/or may be implemented with any semiconductor technology, including one or more of a Bipolar Junction Transistor (BJT), a heterojunction bipolar transistor (HBT), a metal oxide field effect transistor (MOSFET) device, a metal semiconductor field effect transistor (MESFET) or other transconductor or transistor technology device. Such devices may use the same or alternative configurations other than the configuration illustrated in embodiments presented herein.

Techniques and embodiments, including methods, described herein may be implemented in hardware (digital and/or analog) or a combination of hardware and software and/or firmware. Techniques described herein may be implemented in one or more components. Embodiments may comprise computer program products comprising logic (e.g., in the form of program code or instructions as well as firmware) stored on any computer useable storage medium, which may be integrated in or separate from other components. Such program code, when executed in one or more processors, causes a device to operate as described herein. Devices in which embodiments may be implemented may include storage, such as storage drives, memory devices, and further types of computer-readable media. Examples of such computer-readable storage media include, but are not limited to, a hard disk, a removable magnetic disk, a removable optical disk, flash memory cards, digital video disks, random access memories (RAMs), read only memories (ROM), and the like. In greater detail, examples of such computer-readable storage media include, but are not limited to, a hard disk associated with a hard disk drive, a removable magnetic disk, a removable optical disk (e.g., CDROMs, DVDs, etc.), zip disks, tapes, magnetic storage devices, MEMS (microelectromechanical systems) storage, nanotechnology-based storage devices, as well as other media such as flash memory cards, digital video discs, RAM devices, ROM devices, and the like. Such computer-readable storage media may, for example, store computer program logic, e.g., program modules, comprising computer executable instructions that, when executed, provide and/or maintain one or more aspects of functionality described herein with reference to the figures, as well as any and all components, steps and functions therein and/or further embodiments described herein.

Computer readable storage media are distinguished from and non-overlapping with communication media. Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wired media as well as wireless media such as acoustic, RF, infrared and other wireless media. Example embodiments are also directed to such communication media.

The manufacture of tag devices, the authorization of tag reader apparatuses, and/or the forming of a secured network and/or any further systems, sub-systems, and/or components disclosed herein may be implemented in hardware (e.g., hardware logic/electrical circuitry), or any combination of hardware with software (computer program code configured to be executed in one or more processors or processing devices) and/or firmware.

Figure 15:
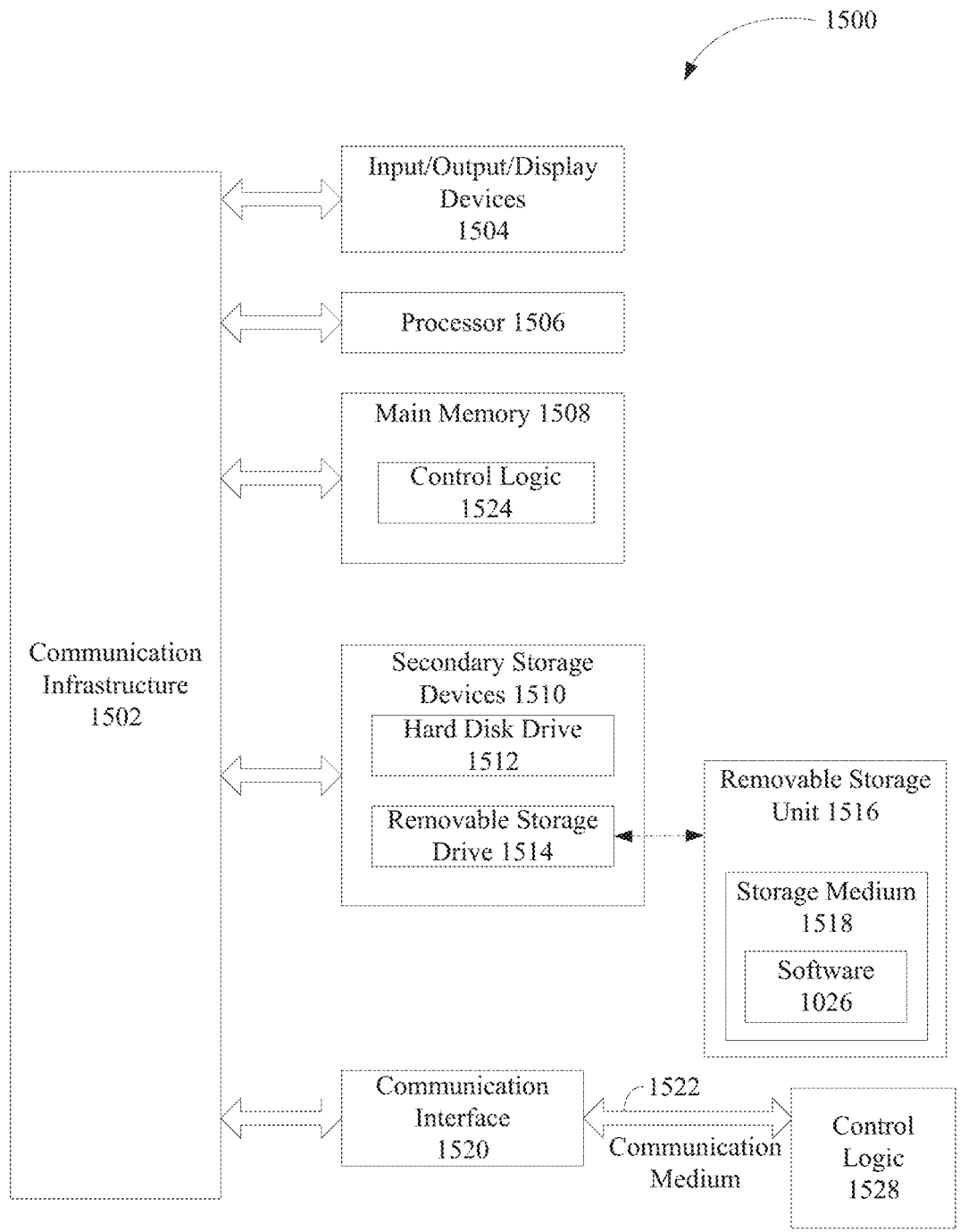
FIG. 15 shows a block diagram of a computing device/system in which the techniques disclosed herein may be performed and the example embodiments herein may be utilized.

The embodiments described herein, including systems, methods/processes, and/or apparatuses, may be implemented using well known processing devices, telephones (smart phones and/or mobile phones), servers, electronic devices (e.g., consumer electronic devices) and/or, computers, such as a computer 1500 shown in FIG. 15. It should be noted that computer 1500 may represent communication devices, processing devices, servers, and/or traditional computers in one or more embodiments. For example, tag reader apparatus 702, tag manufacturer database server(s) 704, tag reader apparatus 902, tag manufacturer database server(s) 904, tag reader apparatus 1202, tag manufacturer database server(s) 1204, device manufacturer database server(s) 1232, first device 1230A, second device 1230B, third device 1230C, fourth device 1230D, tag reader apparatus 1402, tag manufacturer database server(s) 1404, device manufacturer database server(s) 1432, first device 1430A, and/or fourth device 1430B (as described above with reference to FIGS. 7, 9, 12, and 14, respectively), any of the steps of any of the flowcharts of FIGS. 8, 10, 11, and 13, and/or any of the sub-systems, components or sub-components respectively contained therein, may be implemented using one or more computers 1500.

Computer 1500 can be any commercially available and well known communication device, processing device, and/or computer capable of performing the functions described herein, such as devices/computers available from International Business Machines®, Apple®, Sun®, HP®, Dell®, Cray®, Samsung®, Nokia®, etc. Computer 1500 may be any type of computer, including a desktop computer, a server, etc.

Computer 1500 includes one or more processors (also called central processing units, or CPUs), such as a processor 1506. Processor 1506 is connected to a communication infrastructure 1502, such as a communication bus. In some embodiments, processor 1506 can simultaneously operate multiple computing threads.

Computer 1500 also includes a primary or main memory 1508, such as random access memory (RAM). Main memory 1508 has stored therein control logic 1524 (computer software), and data.

Computer 1500 also includes one or more secondary storage devices 1510. Secondary storage devices 1510 include, for example, a hard disk drive 1512 and/or a removable storage device or drive 1514, as well as other types of storage devices, such as memory cards and memory sticks. For instance, computer 1500 may include an industry standard interface, such a universal serial bus (USB) interface for interfacing with devices such as a memory stick. Removable storage drive 1514 represents a floppy disk drive, a magnetic tape drive, a compact disk drive, an optical storage device, tape backup, etc.

Removable storage drive 1514 interacts with a removable storage unit 1516. Removable storage unit 1516 includes a computer useable or readable storage medium 1518 having stored therein computer software 1526 (control logic) and/or data. Removable storage unit 1516 represents a floppy disk, magnetic tape, compact disk, DVD, optical storage disk, or any other computer data storage device. Removable storage drive 1514 reads from and/or writes to removable storage unit 1516 in a well-known manner.

Computer 1500 also includes input/output/display devices 1504, such as touchscreens, LED and LCD displays, monitors, keyboards, pointing devices, etc.

Computer 1500 further includes a communication or network interface 1518. Communication interface 1520 enables computer 1500 to communicate with remote devices. For example, communication interface 1520 allows computer 1500 to communicate over communication networks or mediums 1522 (representing a form of a computer useable or readable medium), such as LANs, WANs, the Internet, etc. Network interface 1520 may interface with remote sites or networks via wired or wireless connections.

Control logic 1528 may be transmitted to and from computer 1500 via the communication medium 1522.

Any apparatus or manufacture comprising a computer useable or readable medium having control logic (software) stored therein is referred to herein as a computer program product or program storage device. This includes, but is not limited to, computer 1500, main memory 1508, secondary storage devices 1510, and removable storage unit 1516.

Such computer program products, having control logic stored therein that, when executed by one or more data processing devices, cause such data processing devices to operate as described herein, represent embodiments of the invention.

Any apparatus or manufacture comprising a computer useable or readable medium having control logic (software) stored therein is referred to herein as a computer program product or program storage device. This includes, but is not limited to, a computer, computer main memory, secondary storage devices, and removable storage units. Such computer program products, having control logic stored therein that, when executed by one or more data processing devices, cause such data processing devices to operate as described herein, represent embodiments of the inventive techniques described herein.

IV. Conclusion

While various embodiments have been described above, it should be understood that they have been presented by way of example only, and not limitation. It will be apparent to persons skilled in the relevant art that various changes in form and detail can be made therein without departing from the spirit and scope of the embodiments. Thus, the breadth and scope of the embodiments should not be limited by any of the above-described exemplary embodiments, but should be defined only in accordance with the following claims and their equivalents.

What is claimed is:

1. A system, comprising:
    at least one processor circuit; and a memory coupled to the at least one processor circuit, the memory storing instructions, which, when executed by the at least one processor circuit, are configured to perform operations by a tag reader application of an authorized tag reader apparatus, the operations comprising:
    receiving a plurality of random identification numbers associated with a plurality of consumer devices, the plurality of random identification numbers being received via read operations performed by the tag reader apparatus with respect to a plurality of tag devices each attached to a corresponding consumer device of the plurality of consumer devices;
    displaying a user-interactive element of the tag reader application that, when activated, causes the plurality of random identification numbers to be transmitted to a first network-based server communicatively coupled to the authorized tag reader apparatus, the first network-based server configured to verify that the tag reader apparatus is authorized and that the plurality of tag devices are authenticated;
    responsive to activation of the user-interactive element, providing the plurality of random identification numbers to the first network-based database, the first network-based database configured to provide the plurality of random identification numbers to a second network-based database server responsive to determining that the tag reader apparatus is authorized and that the plurality of tag devices are authenticated, the second network-based database configured to associate each random identification number of the plurality of random identification numbers with instructions for wirelessly coupling a corresponding consumer device of the plurality of consumer devices with another consumer device of the plurality of consumer devices;
    receiving, via the second network-based database, instructions for wirelessly coupling at least a first consumer device of the plurality of consumer devices with a second consumer device of the plurality of consumer devices; and
    providing the instructions to at least the first consumer device of the plurality of consumer devices, the first consumer device being configured to form a secured network between at least the first consumer device and the second consumer device using the instructions.

2. The system of claim 1, wherein the authorized tag reader apparatus comprises at least one of: a smart phone; a special purpose near field communication reader; a tablet; or a personal data assistant.

3. The system of claim 1, wherein the secured network comprises at least one of:
    a Bluetooth network;
    a local area network; or
    a wide area network.

4. The system of claim 3, wherein the instructions comprise one or more Bluetooth authentication codes.

5. The system of claim 1, wherein the first consumer device is a master device and the second consumer device is a slave device.

6. The system of claim 5, wherein the master device is configured to initiate a wireless connection with the slave device using the instructions.

7. The system of claim 5, wherein the master device comprises a home automation hub device, and wherein the slave device comprises at least one of: a security sensor; a home appliance; a computing device; or a network device.

8. A computer-readable storage medium having program instructions recorded thereon that, when executed by a processing device, perform a method of a tag reader application of the authorized tag reader apparatus for forming a secured network comprising a plurality of consumer devices, the method comprising:
    receiving a plurality of random identification numbers associated with each of the plurality of consumer devices, the plurality of random identification numbers being received via read operations performed by the tag reader apparatus with respect to a plurality of tag devices each attached to a corresponding consumer device of the plurality of consumer devices;
    displaying a user-interactive element of the tag reader application that, when activated, causes the plurality of random identification numbers to be transmitted to a first network-based server communicatively coupled to the authorized tag reader apparatus, the first network-based server configured to verify that the tag reader apparatus is authorized and that the plurality of tag devices are authenticated;
    responsive to activation of the user-interactive element, providing the plurality of random identification numbers to the first network-based database, the first network-based database configured to provide the plurality of random identification numbers to a second network-based database server responsive to determining that the tag reader apparatus is authorized and that the plurality of tag devices are authenticated, the second network-based database configured to associate each random identification number of the plurality of random identification numbers with instructions for wirelessly coupling a corresponding consumer device of the plurality of consumer devices with another consumer device of the plurality of consumer devices;

receiving, via the second network-based database, instructions for wirelessly coupling at least a first consumer device of the plurality of consumer devices with a second consumer device of the plurality of consumer devices; and providing the instructions to at least the first consumer device of the plurality of consumer devices, the first consumer device being configured to form the secured network between at least the first consumer device and the second consumer device using the instructions.

9. The computer-readable storage medium of claim 8, wherein the secured network comprises at least one of: a Bluetooth network; a local area network; or a wide area network.

10. The computer-readable storage medium of claim 9, wherein the instructions comprise one or more Bluetooth authentication codes.

11. The computer-readable storage medium of claim 8, wherein the first consumer device is a master device and the second consumer device is a slave device.

12. The computer-readable storage medium of claim 11, wherein the master device is configured to initiate a wireless connection with the slave device using the instructions.

13. The computer-readable storage medium of claim 11, wherein the master device comprises a home automation hub device, and wherein the slave device comprises at least one of: a security sensor; a home appliance; a computing device; or a network device.

14. A method implemented by a tag reader application of an authorized tag reader apparatus for forming a secured network comprising a plurality of consumer devices, comprising:

receiving a plurality of random identification numbers associated with the plurality of consumer devices, the plurality of random identification numbers being received via read operations performed by the tag reader apparatus with respect to a plurality of tag devices each attached to a corresponding consumer device of the plurality of consumer devices;

displaying a user-interactive element of the tag reader application that, when activated, causes the plurality of random identification numbers to be transmitted to a first network-based server communicatively coupled to the authorized tag reader apparatus, the first network-based server configured to verify that the tag reader apparatus is authorized and that the plurality of tag devices are authenticated;

responsive to activation of the user-interactive element, providing the plurality of random identification numbers to the first network-based database, the first network-based database configured to provide the plurality of random identification numbers to a second network-based database server responsive to determining that the tag reader apparatus is authorized and that the plurality of tag devices are authenticated, the second network-based database configured to associate each random identification number of the plurality of random identification numbers with instructions for wirelessly coupling a corresponding consumer device of the plurality of consumer devices with another consumer device of the plurality of consumer devices;

receiving, via the second network-based database, instructions for wirelessly coupling at least a first consumer device of the plurality of consumer devices with a second consumer device of the plurality of consumer devices; and providing the instructions to at least the first consumer device of the plurality of consumer devices, the first consumer device being configured to form the Hall secured network between at least the first consumer device and the second consumer device using the instructions.

15. The method of claim 14, wherein the authorized tag reader apparatus comprises at least one of: a smart phone; a special purpose near field communication reader; a tablet; or a personal data assistant.

16. The method of claim 14, wherein the secured network comprises at least one of: a Bluetooth network; a local area network; or a wide area network.

17. The method of claim 16, wherein the instructions comprise one or more Bluetooth authentication codes.

18. The method of claim 14, wherein the first consumer device is a master device and the second consumer device is a slave device.

19. The method of claim 18, wherein the master device is configured to initiate a wireless connection with the slave device using the instructions.

20. The method of claim 18, wherein the master device comprises a home automation hub device, and wherein the slave device comprises at least one of: a security sensor; a home appliance; a computing device; or a network device.

* * * * *

UNITED STATES PATENT AND TRADEMARK OFFICE
CERTIFICATE OF CORRECTION

PATENT NO. : 10,582,359 B2
APPLICATION NO. : 15/451063
DATED : March 3, 2020
INVENTOR(S) : Michael R. Arneson et al.

Page 1 of 1

It is certified that error appears in the above-identified patent and that said Letters Patent is hereby corrected as shown below:

In the Claims

In Column 28, Line 40, in Claim 8, delete "with each of the" and insert -- with the --, therefor.

In Column 30, Line 23, in Claim 14, delete "the Hall" and insert -- the --, therefor.

Signed and Sealed this
Fifth Day of May, 2020

Andrei Iancu
*Director of the United States Patent and Trademark Office*